US012195277B2

(12) United States Patent
Augustsson

(10) Patent No.: US 12,195,277 B2
(45) Date of Patent: Jan. 14, 2025

(54) NAVIGATOR FOR INTRALOGISTICS

(71) Applicant: FQ IP AB, Mölndal (SE)

(72) Inventor: Per Augustsson, Kullavik (SE)

(73) Assignee: FQ IP AB, Mölndal (SE)

( * ) Notice: Subject to any disclaimer, the term of this patent is extended or adjusted under 35 U.S.C. 154(b) by 751 days.

(21) Appl. No.: 17/289,515

(22) PCT Filed: Oct. 28, 2019

(86) PCT No.: PCT/EP2019/079399
§ 371 (c)(1),
(2) Date: Apr. 28, 2021

(87) PCT Pub. No.: WO2020/089170
PCT Pub. Date: May 7, 2020

(65) Prior Publication Data
US 2021/0354924 A1    Nov. 18, 2021

(30) Foreign Application Priority Data

Oct. 29, 2018   (EP) .................................... 18203082
Mar. 8, 2019    (EP) .................................... 19161486

(51) Int. Cl.
*B65G 1/137* (2006.01)
*G05D 1/00* (2006.01)
*H04N 23/00* (2023.01)

(52) U.S. Cl.
CPC ......... *B65G 1/1375* (2013.01); *G05D 1/0236* (2013.01); *G05D 1/0295* (2013.01); *H04N 23/00* (2023.01)

(58) Field of Classification Search
CPC .. B65G 1/1375; G05D 1/0236; G05D 1/0295; H04N 23/00
See application file for complete search history.

(56) References Cited

U.S. PATENT DOCUMENTS 8,768,559 B1      7/2014  Murphy
2005/0213082 A1   9/2005  Dibernardo et al.
(Continued)

FOREIGN PATENT DOCUMENTS

EP    2946712 A1    11/2015
JP    2553912 B2    11/1996
(Continued)

OTHER PUBLICATIONS

Winkens , et al., "Optical Truck Tracking for Autonomous Platooning", Computer Analysis of Images and Patterns; retrieved from the Internet; URL:https://link.springer.com/content/odf/10.1007/978-3-319-23117-4_4.pdf [retrieved on Mar. 25, 2019], Aug. 26, 2015, 11 pages.

*Primary Examiner* — Kyle O Logan
(74) *Attorney, Agent, or Firm* — Flaster Greenberg P.C.

(57) ABSTRACT

A system for intralogistics comprising a self-propelled load bearing cart (200, 200', 200", 200'", 200B) and a remote controlled or autonomous self-propelled guide unit (100, 100'). The self-propelled load bearing cart (200, 200', 200", 200'", 200B) comprises a drive unit (223) comprising at least one drive wheel (222) for propelling the self-propelled load bearing cart (200, 200', 200", 200'", 200B), a mechanical connection (172), and a computing unit (253) connected to the drive unit (223). The computing unit (253) comprises a transceiving unit (253') for communicating with the remote controlled or autonomous self-propelled guide unit (100, 100), and the remote controlled or autonomous self-propelled guide unit (100, 100') comprises a mechanical connection (171) configured to connect to the mechanical connection (172) of the self-propelled load bearing cart (200, 200', 200", 200', 200B), such that a mechanical interconnection can be created between the remote controlled or autonomous self-propelled guide unit (100, 100')

(Continued)

and the self-propelled bearing cart (200, 200', 200", 200', 200B).

20 Claims, 11 Drawing Sheets

(56) References Cited

U.S. PATENT DOCUMENTS

| | | |
|---|---|---|
| 2006/0106507 A1 | 5/2006 | Ledet et al. |
| 2015/0297052 A1* | 10/2015 | Eidmohammadi .......................... A47L 11/4066 15/4 |
| 2017/0190048 A1* | 7/2017 | Vice ..................... G05D 1/0295 |
| 2018/0113466 A1 | 4/2018 | Schulze |
| 2018/0129223 A1* | 5/2018 | High .................... G05D 1/0202 |
| 2018/0308365 A1 | 10/2018 | Liu et al. |
| 2019/0283239 A1* | 9/2019 | Skaaksrud ................ H02J 9/00 |
| 2021/0354924 A1* | 11/2021 | Augustsson ......... B62D 53/005 |

FOREIGN PATENT DOCUMENTS

| | | |
|---|---|---|
| WO | 2017039546 A1 | 3/2017 |
| WO | 2020089170 A1 | 5/2020 |

\* cited by examiner

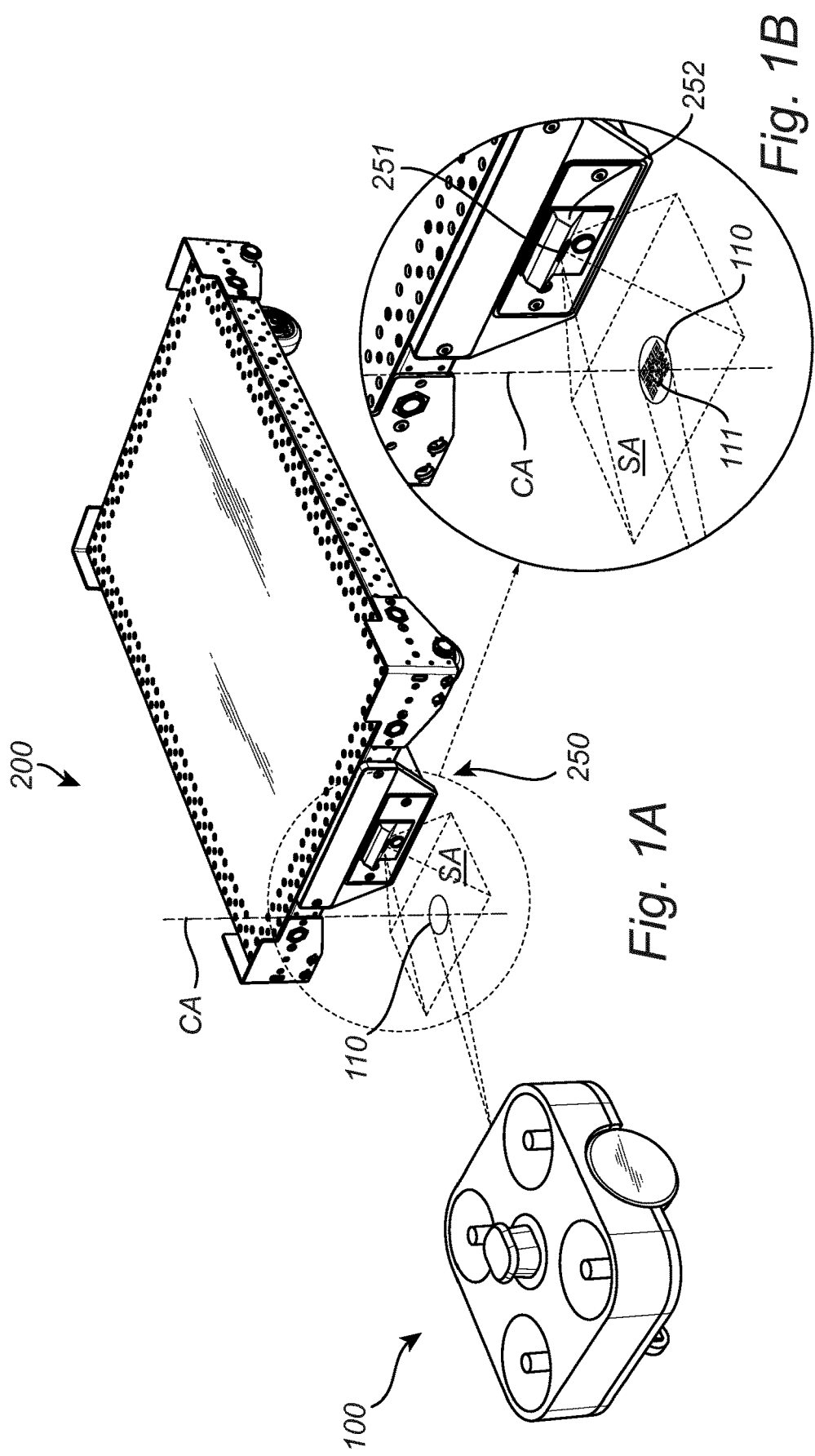

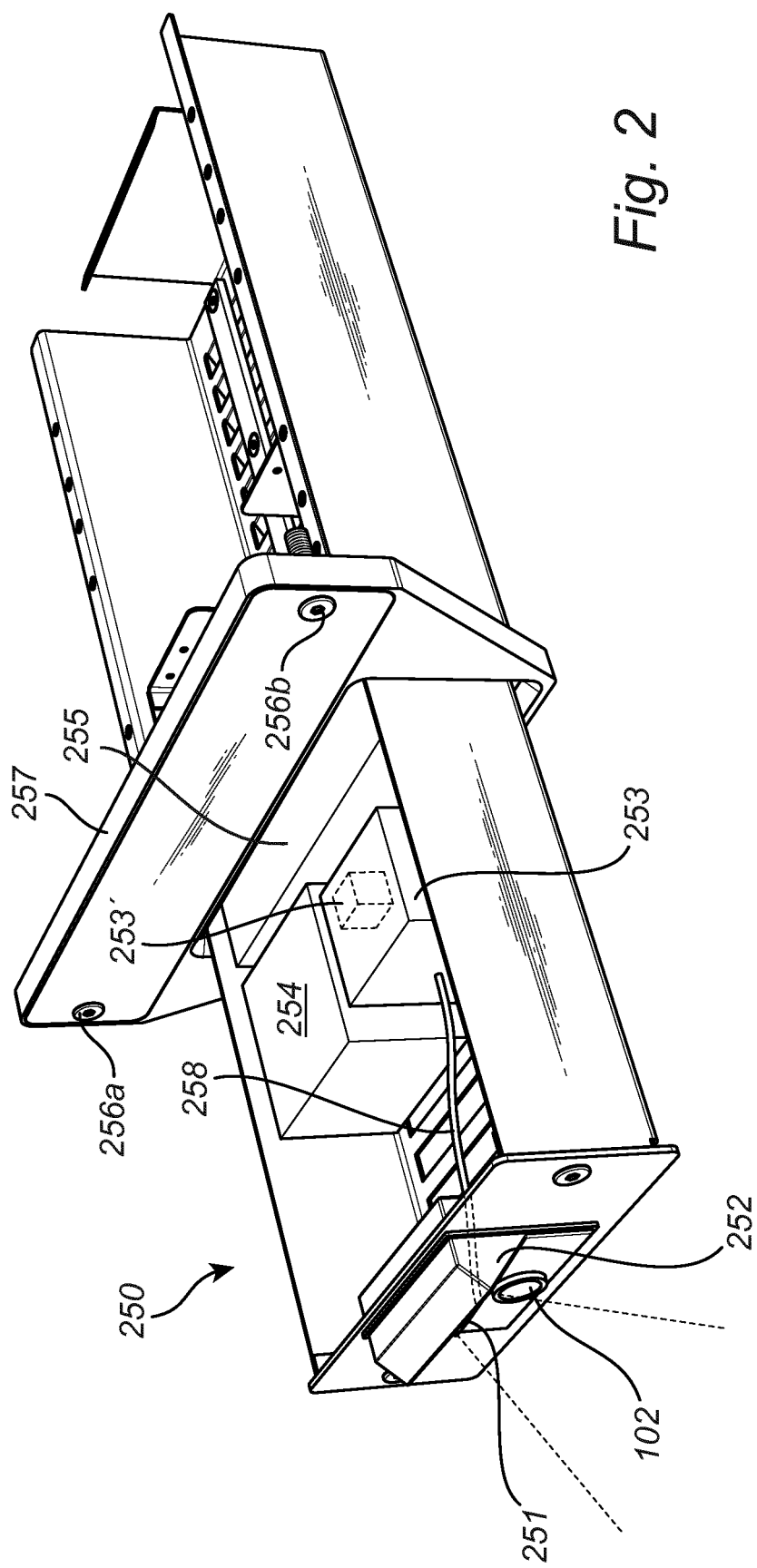

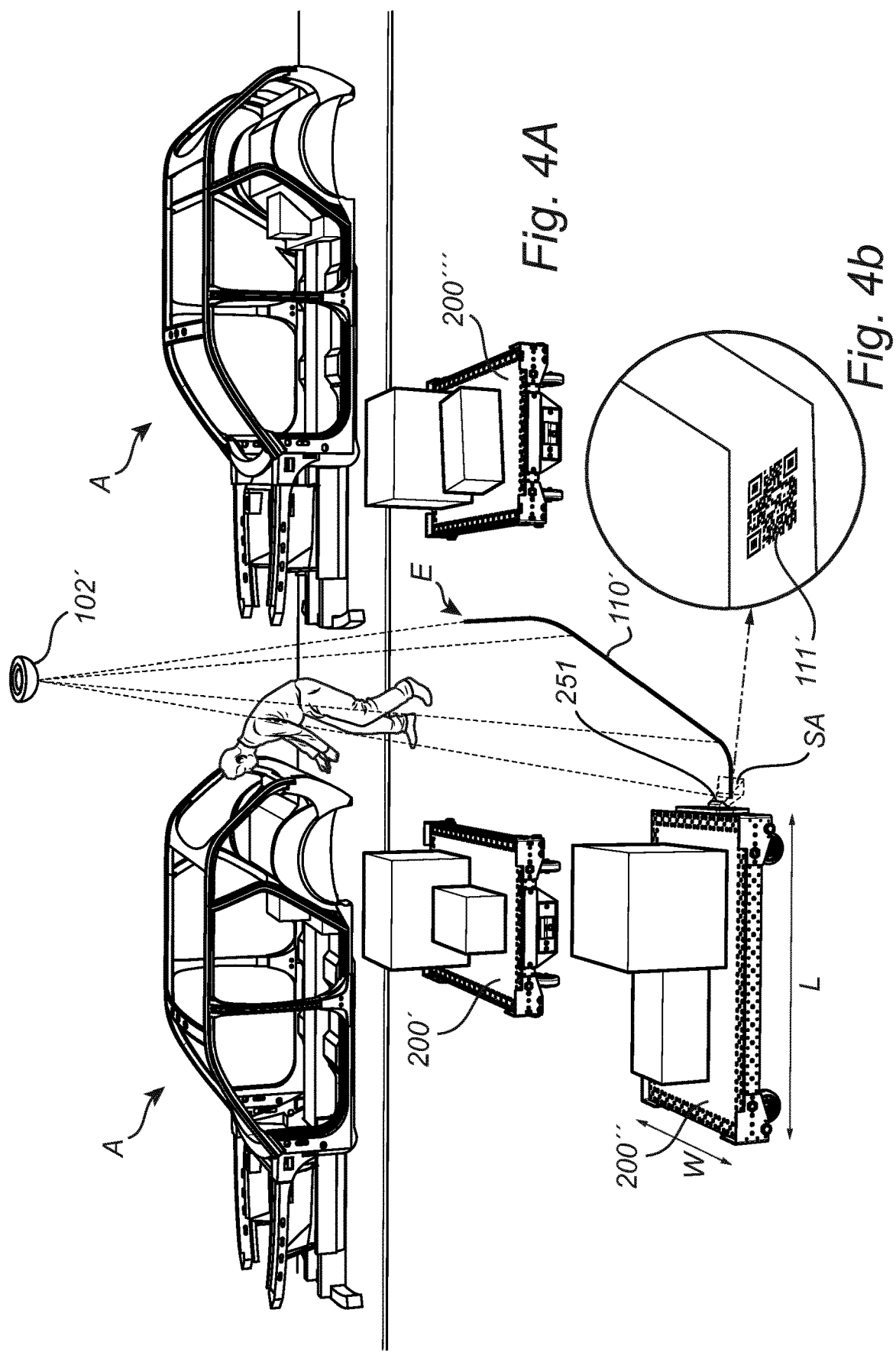

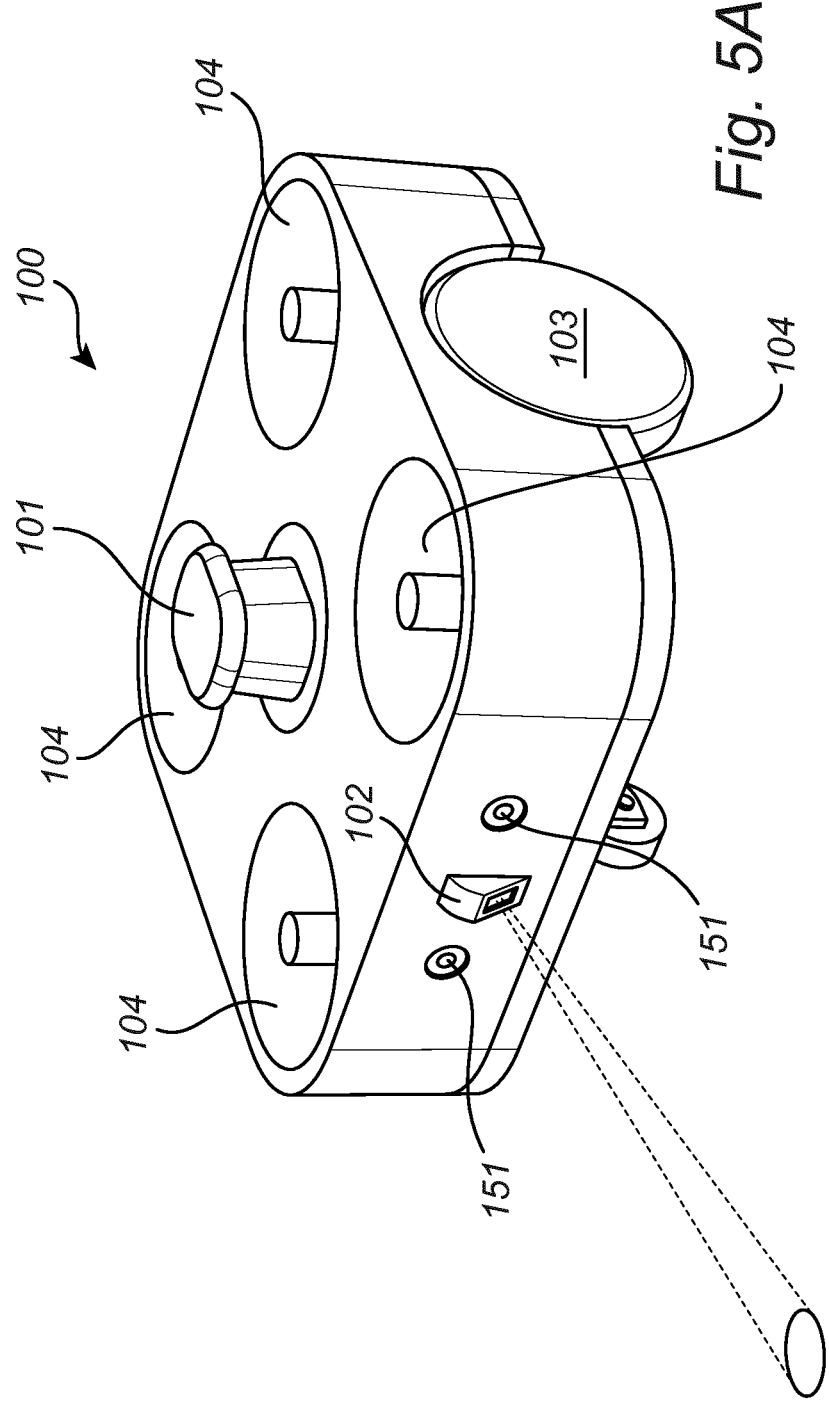

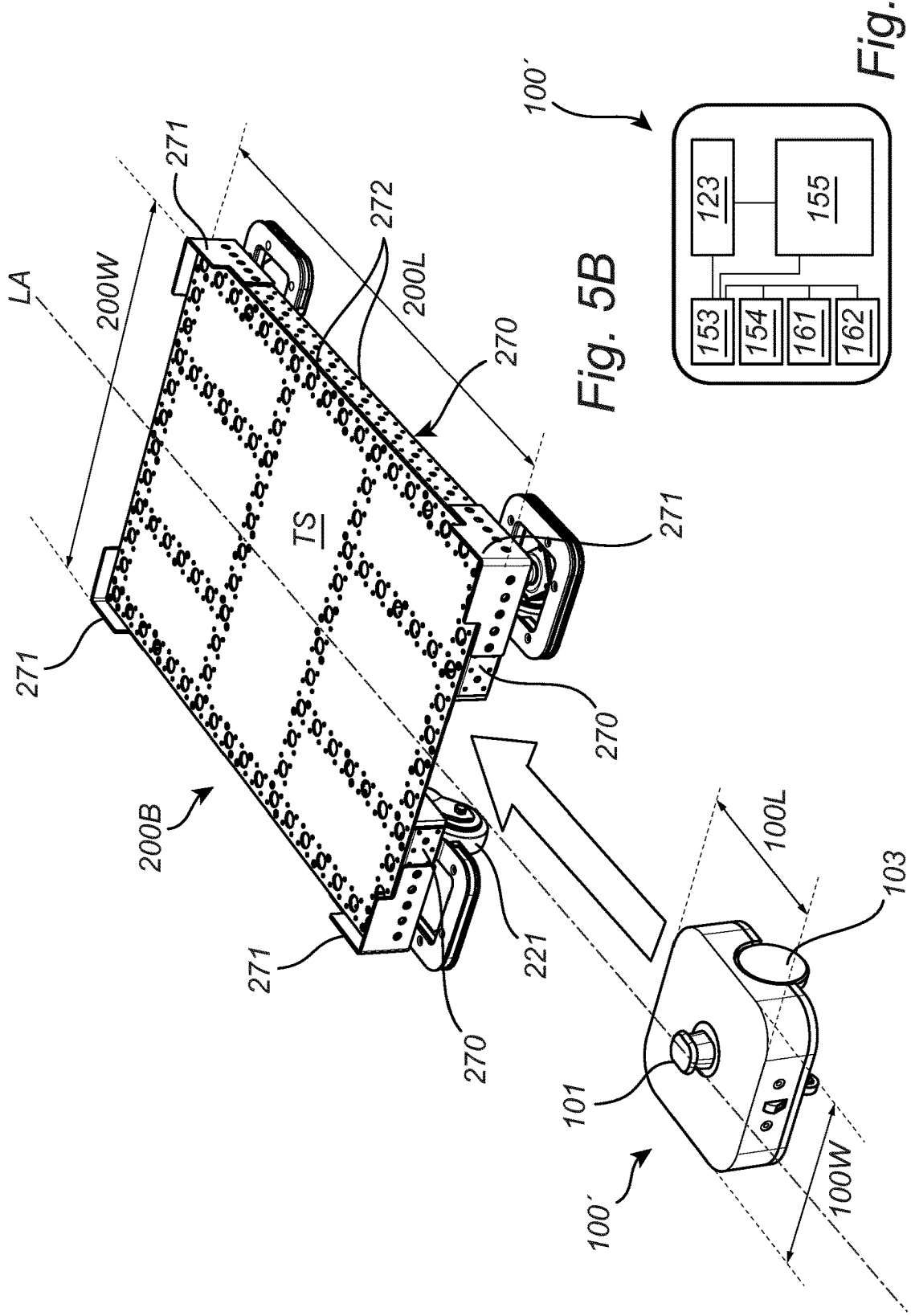

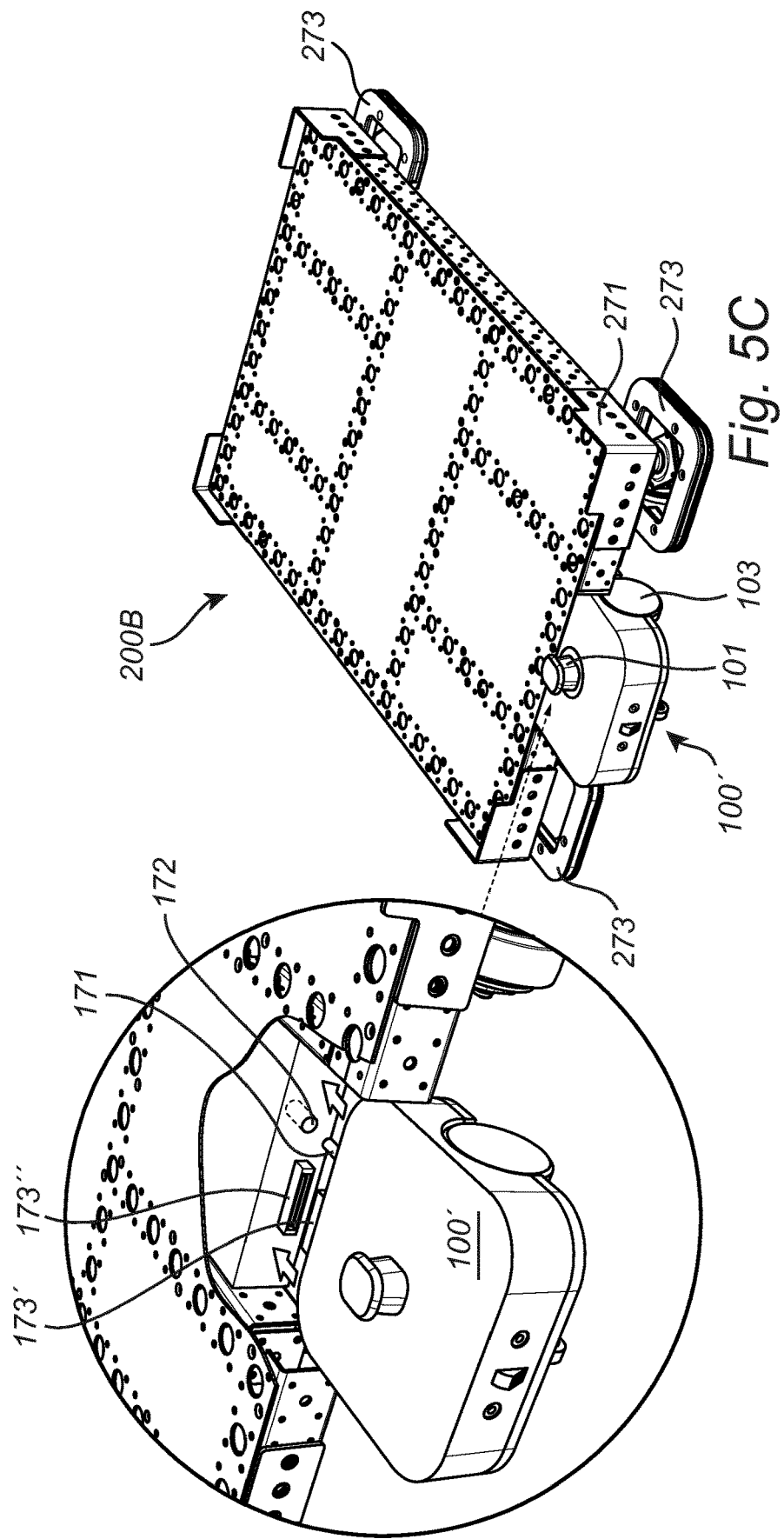

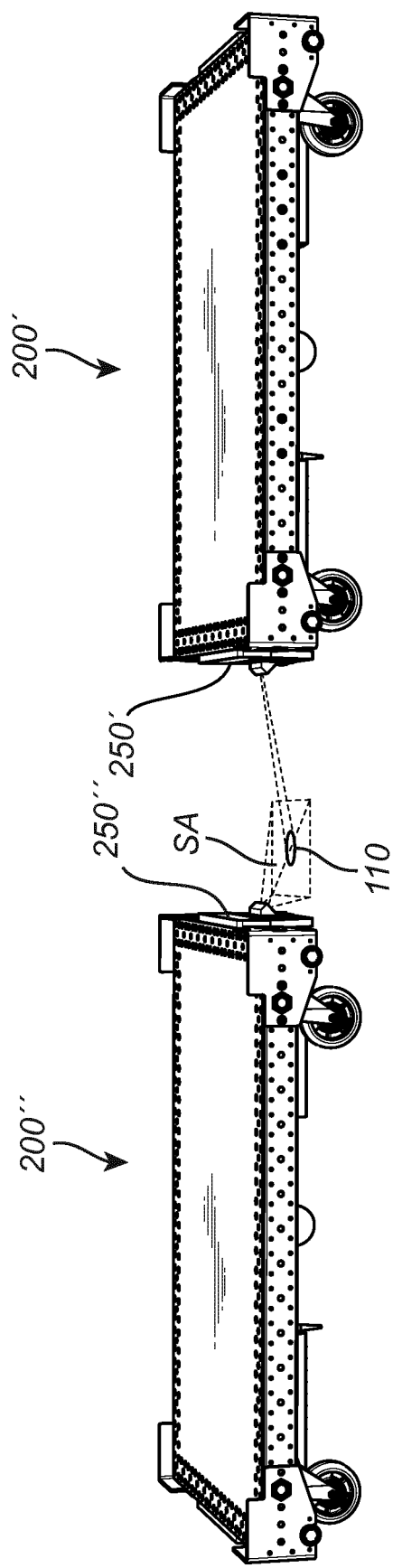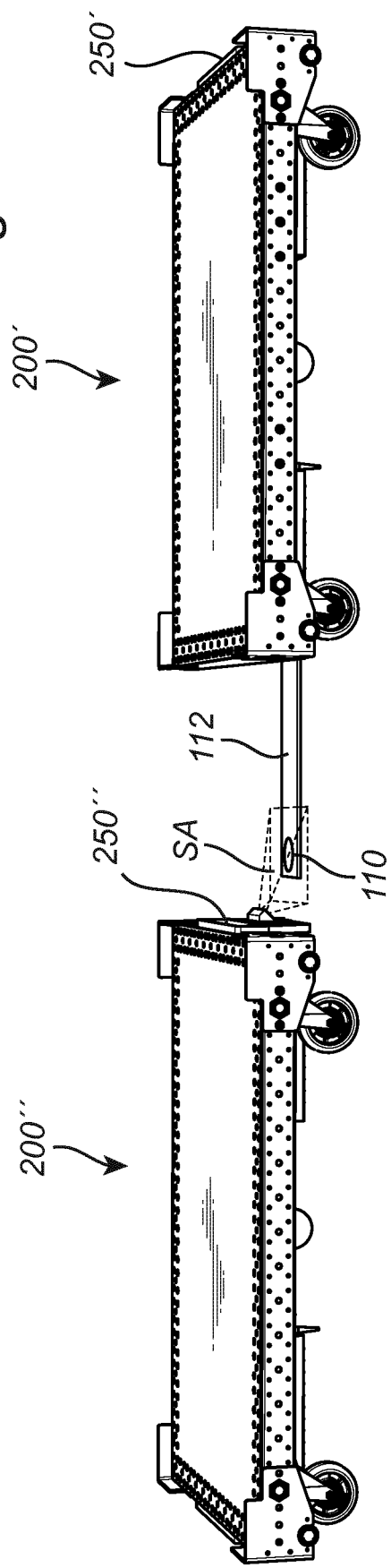

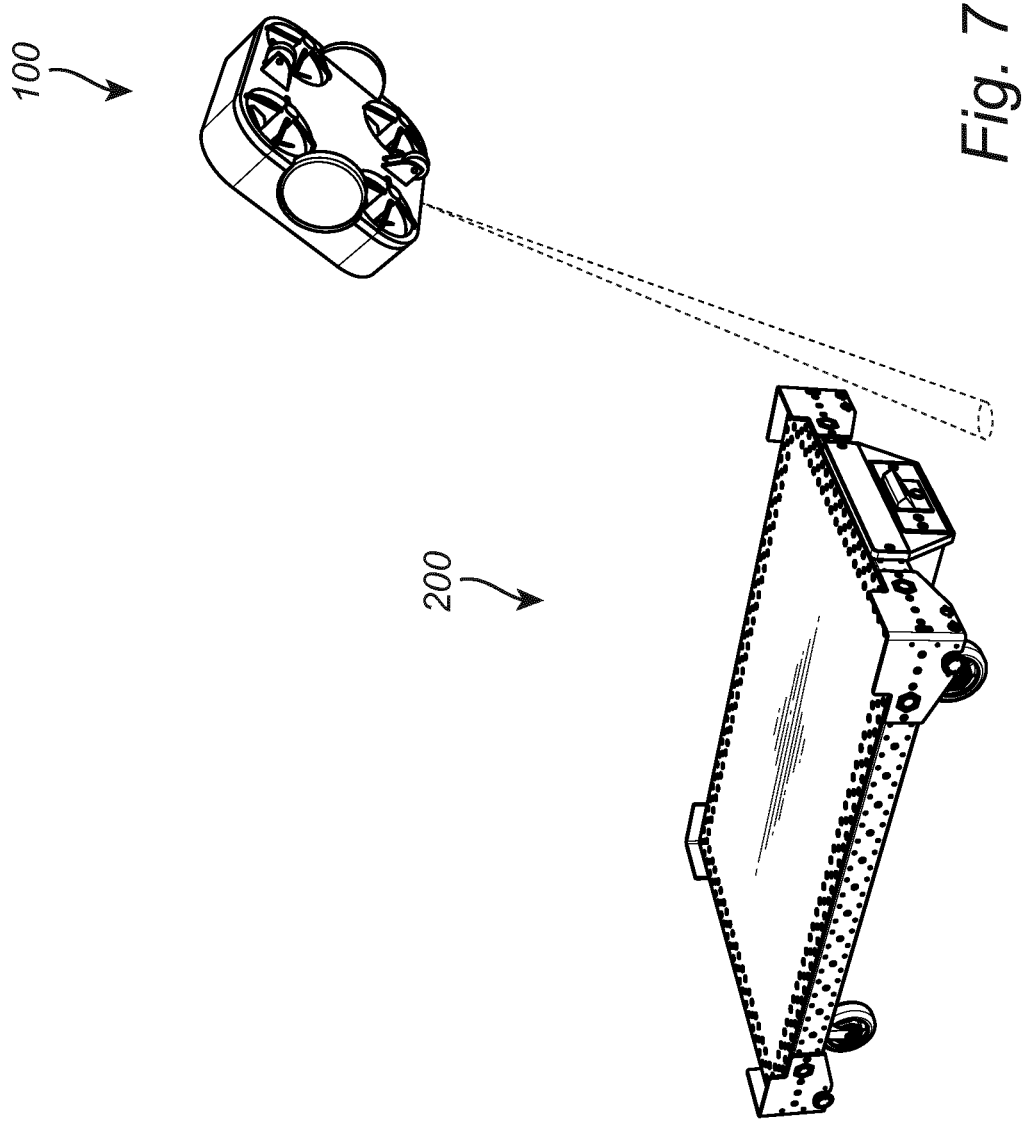

NAVIGATOR FOR INTRALOGISTICS

CROSS-REFERENCE TO RELATED APPLICATIONS

This application is the 371 National Stage of International Application No. PCT/EP2019/079399, filed Oct. 28, 2019, which claims priority to European Application No. 19161486.6, filed Mar. 8, 2019, and European Application No. 18203082.5, filed on Oct. 29, 2018, the disclosures of which are incorporated herein by reference in their entireties.

FIELD OF THE INVENTION

This invention relates to a logistic system for self-propelled load bearing carts.

BACKGROUND ART

All forms of handling of goods, material or items of manufacturing requires intralogistics, i.e. logistics within some confined area such as a factory, warehouse or yard. Traditionally, forklifts have been the dominating vehicle both for transporting pallets of smaller items and larger items individually. Forklifts however have many limitations. They are generally limited to lifting items specifically adapted for the forks, such as pallets. They also require a relatively large clearance to operate and they are the root of many work place accidents. The forklifts are thus not suitable for use in environments populated with human workers. As a consequence, forklifts are being replaced in many environments by manual carts pushed by human workers. The carts are less likely to cause accidents and are much more adaptable to specific uses or sizes of the transported items. However, the manual carts also have drawbacks, such as limitations of the maximum load capacity that a human operator can handle, and in that the logistic system becomes relatively labor intensive.

SUMMARY

It is an object to mitigate, alleviate or eliminate one or more of the above-identified deficiencies in the art and disadvantages singly or in any combination.

According to one aspect of the present inventive concept, a system for intralogistics is provided. The system comprises a self-propelled load bearing cart and a remote controlled or autonomous self-propelled guide unit. The self-propelled load bearing cart comprises a drive unit comprising at least one drive wheel for propelling the self-propelled load bearing cart, a mechanical connection, and a computing unit connected to the drive unit. The computing unit comprises a transceiving unit for communicating with the remote controlled or autonomous self-propelled guide unit.

The remote controlled or autonomous self-propelled guide unit comprises a mechanical connection configured to connect to the mechanical connection of the self-propelled load bearing cart, such that a mechanical interconnection can be created between the remote controlled or autonomous self-propelled guide unit, and the self-propelled load bearing cart. The remote controlled or autonomous self-propelled guide unit further comprises a drive unit comprising at least one drive wheel for propelling the remote controlled or autonomous self-propelled guide unit, and a computing unit comprising a transceiving unit for communicating with the transceiving unit of the self-propelled load bearing cart, a navigation unit for navigating in an environment, and a sensor unit, for sensing objects in the environment. The computing unit of the autonomous self-propelled guide unit is configured to generate control signals on the basis of input from the navigation unit and the sensor unit and transmit the control signals using the transceiving unit to the self-propelled load bearing cart for controlling the drive unit of the self-propelled load bearing cart.

According to one embodiment, the remote controlled or autonomous self-propelled guide unit has a size which is less than 50% of the size of the self-propelled load bearing cart.

According to one embodiment, the remote controlled or autonomous self-propelled guide unit, has a top speed which is at least 200% of the top speed of the self-propelled load bearing cart.

According to one embodiment, the mechanical interconnection is configured to fixate the remote controlled or autonomous self-propelled guide unit to the self-propelled load bearing cart.

According to one embodiment, the remote controlled or autonomous self-propelled guide unit, and the self-propelled load bearing cart each comprises an electrical connection such that the remote controlled or autonomous self-propelled guide unit can be electrically connected to the self-propelled load bearing cart.

According to one embodiment, the electrical connection of the remote controlled or autonomous self-propelled guide unit and the self-propelled load bearing cart is configured to transfer electrical energy.

According to one embodiment, the remote controlled or autonomous self-propelled guide unit comprises an energy storage for powering the self-propelled load bearing cart.

According to one embodiment, the electrical connection of the autonomous self-propelled guide unit and the self-propelled load bearing cart is configured to transfer data.

According to one embodiment, the transceiving units of the autonomous self-propelled guide unit and the self-propelled load bearing cart are wireless transceiving units.

According to one embodiment, the mechanical connection of the self-propelled load bearing cart comprises at least one of a recess and a protrusion and the mechanical connection of the remote controlled or autonomous self-propelled guide unit comprises at least one of a corresponding recess or protrusion for mechanical interconnection between the self-propelled load bearing cart and the remote controlled or autonomous self-propelled guide unit.

According to one embodiment, the self-propelled load bearing cart further comprises at least one sensor, and the transceiving unit of the self-propelled load bearing cart is configured to transmit sensor data to the transceiving unit of the remote controlled or autonomous self-propelled guide unit.

According to one embodiment, the remote controlled or autonomous self-propelled guide unit is configured to generate control signals on the basis of the received sensor data.

According to one embodiment, the self-propelled load bearing cart comprises at least one of a sensor selected from a list consisting of pressure sensors, motion sensors and Lidar.

According to one embodiment, the remote controlled or autonomous self-propelled guide unit is configured to be placed at least partially under the self-propelled load bearing cart.

According to one embodiment, the self-propelled load bearing cart comprises at least one support element for supporting a Euro-pallet.

According to one embodiment, the mechanical connection is configured to fixate the remote controlled or autonomous self-propelled guide unit to the self-propelled load bearing cart both in the direction of a length axis of the self-propelled load bearing cart and in a direction perpendicular to the length axis of the self-propelled load bearing cart.

According to one aspect of the present inventive concept, a system for intralogistics is provided. The system comprises a self-propelled load bearing cart configured to follow an optical projected route. The self-propelled load bearing cart comprises an optical sensor configured to sense a vertical sensor area vertically overlapping a portion of the optical projected route. The optical sensor is configured to derive sensor signals based on sensing of the optical projected route. The self-propelled load bearing cart further comprises a drive unit and a computing unit. The computing unit is configured to receive the sensor signals, generate control signals on the basis of the received sensor signals, and transfer the control signals to the drive unit, such that the self-propelled load bearing cart can follow the optical projected route. The system further comprises a projector configured to project the optical projected route. The advantage with projecting an optical projected route is that humans working in the area of the system for intralogistics can predict where the self-propelled load bearing carts are headed and thus predict the movements of the self-propelled load bearing carts.

According to one embodiment, the optical projected route comprises a projected line and the self-propelled load bearing cart is configured to follow the projected line. Having the optical projected route in the form of a projected line makes it easy for humans to predict the route and makes it easy for the optical sensor of the self-propelled load bearing cart to follow the optical projected route.

According to one embodiment, the optical projected route comprises an optical code and the optical sensor of the self-propelled load bearing cart is configured to read the optical code, and the computing unit of the self-propelled load bearing cart is configured to derive information from the read optical code. Inclusion of an optical code in the optical projected route makes it possible for the projector to communicate for example driving instructions to the self-propelled load bearing cart via the projection and thus without any additional means of communication.

According to one embodiment, the optical code could comprise a QR-code or the thickness or color of the projected line. Having the code in a format which is easy for a human to see makes it possible also for the human to determine the future movements of the self-propelled load bearing carts, which reduces the risk of collisions.

According to one embodiment, the self-propelled load bearing cart comprises a wireless communication unit configured to at least one of transmit and receive wireless communication to and/or from the projector.

According to one aspect of the present inventive concept a method for intralogistics is provided. The method comprises projecting, using a projector, an optical projected route onto a surface. The optical projected route is a route to be followed by a self-propelled load bearing cart, and the method further comprises the self-propelled load bearing cart following the optical projected route. The step of projecting the optical projected route may comprise projecting an optical projected route having a length exceeding the length of the self-propelled load bearing cart. Having a relatively long optical projected route makes it possible for humans in the area to predict the movements of the self-propelled load bearing carts well in advance.

According to one embodiment, projecting an optical projected route comprises projecting a line, and the self-propelled load bearing cart following the optical projected route comprises the self-propelled load bearing cart following the projected line.

According to one embodiment, projecting an optical projected route comprises projecting an optical code. The method further comprises the self-propelled load bearing cart reading the optical code using an optical sensor, and the computing unit deriving information from the read optical code. The method may further comprise the computing unit generating control signals on the basis of the derived information.

According to one embodiment, the method further comprises the self-propelled load bearing cart transmitting wireless communication directly or indirectly to the projector, the projector receiving the communication, and the projector adapting the optical projected route in response to the received communication.

According to one aspect of the present inventive concept there is provided a modular optical unit. The modular optical unit is configured to be mounted to a self-propelled load bearing cart. The modular optical unit comprises an optical sensor which is configured to sense a vertical sensor area. The vertical sensor area is vertically overlapping a mobile optical marker. The optical sensor is configured to derive sensor signals based on optical sensing of the mobile optical marker. The modular optical unit also comprises a computing unit. The computing unit is configured to receive the sensor signals and determine change in velocity and change in direction of the mobile optical marker. The computing unit is also configured to generate control signals on the basis of the determined change in velocity and change in direction. The computing unit is further configured to transfer the control signals to the self-propelled load bearing cart, such that the self-propelled load bearing cart can follow the modular optical unit.

The modular optical unit enables self-propelled load bearing carts or other automated guided vehicles to be controlled and steered without the need for a human driver. The modular optical unit could be placed on carts operating in industrial environments such as warehouses or factories where on- and off-loading of goods and equipment need to be made in a precise and efficient manner. The modularity of the unit makes it possible to easily retrofit and update existing self-propelled load bearing carts. It also makes it possible to remove the modular unit for charging, data communication, maintenance and replacement.

According to one aspect, the modular optical unit further comprises a wireless communication unit. The wireless communication unit is configured to at least one of transmit and receive a wireless identity signal. The wireless communication unit makes it possible to provide bi-directional communication with any other wireless communication unit in the logistics system.

According to one aspect, the computing unit is further configured to derive identity data from the received sensor signals. The mobile optical marker may comprise an optical code and the optical sensor may be configured to read the optical code, and the computing unit may be configured to derive identity data from the read optical code. Embodiments in which the optical marker contains an optical code are easy to implement and make it possible for the computing unit to select which optical marker to follow if several are present in the system.

According to one aspect, a virtual coupling between a self-propelled load bearing cart and a mobile optical marker is provided. The virtual coupling comprises a mobile optical marker and an optical sensor mounted to the self-propelled load bearing cart. The optical sensor is configured to sense a vertical sensor area. The vertical sensor area is vertically overlapping the mobile optical marker. The optical sensor is configured to derive sensor signals based on sensing of the mobile optical marker. A virtual coupling is very versatile and easy to adapt, as no mechanical specifically adapted connections are needed. The system can also be easily updated e.g. by software upgrades.

According to one aspect, the virtual coupling further comprises a computing unit configured to receive the sensor signals and determine change in velocity and change in direction of the mobile optical marker. The computing unit is also configured to generate control signals on the basis of the determined change in velocity and change in direction, and transfer the control signals to the self-propelled load bearing cart, such that the self-propelled load bearing cart can follow the mobile optical marker. To create a modular unit, the computing unit may be integrated with the optical sensor.

According to one aspect, the mobile optical marker displays an optical difference in at least two different directions, enabling the determination of change in velocity and direction in all directions in a plane. The mobile optical marker may display an optical difference in at least four different directions which facilitates directional computations. The four different directions may be a first, a second, a third and a fourth direction, wherein the first and second direction are substantially opposite directions and the third and fourth directions are substantially opposite directions.

According to one aspect, the mobile optical marker comprises a circular optical marker, further facilitating the directional computations.

According to one aspect, the vertical sensor area has a vertical sensor area center axis and a computing unit which is configured to generate control signals for aligning the vertical sensor area center axis with a center axis of the mobile optical marker, such that the self-propelled load bearing cart follows the mobile optical marker. A central reference points facilitates control and navigation.

The mobile optical marker may be provided on a mobile unit operated by a human driver or on a remote controlled or autonomous unit. The remote controlled or autonomous unit, or mobile unit operated by a human driver, may comprise a projector configured for projecting the optical marker. Having a projected optical marker makes it easy to change the configuration of the optical marker. The projector may further be configured to project an optical code comprising identity information to be read by the optical sensor. This enables the sensing unit to determine the identity of the projecting unit and thus select which optical marker to follow.

According to one aspect, the mobile unit operated by a human driver or the remote controlled or autonomous unit may comprise a wireless communication unit. The wireless communication unit is configured to at least one of transmit and receive wireless communication to or from the self-propelled load bearing cart. The wireless communication unit makes it possible to provide bi-directional communication with the self-propelled load bearing cart. The wireless communication unit is configured to at least one of receive and transmit identity information to or from the self-propelled load bearing cart, which may function as an identification/verification process between the mobile unit operated by a human driver or the remote controlled or autonomous unit and the self-propelled load bearing cart.

The mobile optical marker in any of the aspects herein may comprise a projected optical marker. Having a projected optical marker makes it easy to change the configuration of the optical marker. The mobile optical marker may comprise an optical code, which enables a sensing unit to determine the identity of the projecting unit and thus select which optical marker to follow.

The virtual coupling in any of the aspects may further comprise a wireless communication unit configured to at least one of transmit and receive a wireless identity signal.

The remote controlled or autonomous unit in any of the aspects herein may comprise means for flying, which may provide access to areas having limited accessibility and enable rapid movement across for example a factory when a guiding task has been concluded.

According to one aspect, the virtual coupling further comprises a stationary projector configured to project the mobile optical marker. The stationary projector may be a roof mounted stationary projector. The stationary projector may function as a maritime pilot, guiding a self-propelled load bearing cart in areas in which high precision is important.

The virtual coupling in any of the aspects may comprise a projected optical code comprising identity information, to be read by the optical sensor.

According to another aspect of the present inventive concept, a self-propelled load bearing cart is provided. The self-propelled load bearing cart is configured to follow a mobile optical marker. The self-propelled load bearing cart comprises an optical sensor. The optical sensor is configured to sense a vertical sensor area which is vertically overlapping the mobile optical marker. The optical sensor is configured to derive sensor signals based on sensing of the mobile optical marker. The self-propelled load bearing cart also comprises a drive unit and a computing unit. The computing unit is configured to receive the sensor signals, determine change in velocity and change in direction of the mobile optical marker, generate control signals on the basis of the determined change in velocity and change in direction, and transfer the control signals to the drive unit, such that the self-propelled load bearing cart follows the mobile optical marker.

The mobile optical marker may comprise an optical code, and the optical sensor may be configured to read the optical code. Further, the computing unit may be configured to derive identity data from the read optical code.

The self-propelled load bearing cart in any of the aspects may further comprise a wireless communication unit configured to at least one of transmit and receive a wireless identity signal.

A system comprising a self-propelled load bearing cart and a mobile optical marker is further provided. The mobile optical marker comprises a self-propelled remote controlled or autonomous unit, and the self-propelled load bearing cart comprises an optical sensor configured to sense a vertical sensor area vertically overlapping the mobile optical marker. The optical sensor is configured to derive sensor signals based on sensing of the mobile optical marker. The self-propelled load bearing cart further comprises a drive unit and a computing unit. The computing unit is configured to receive the sensor signals, determine change in velocity and change in direction of the mobile optical marker, generate control signals on the basis of the determined change in velocity and change in direction, and transfer the control signals to the drive unit, such that the self-propelled load bearing cart follows the mobile optical marker.

The system may comprise a remote controlled or autonomous unit comprising means for flying.

A method in a self-propelled load bearing cart is further provided. The method comprises sensing a projected optical marker using an optical sensor, deriving a control signal from the sensed optical marker using a computing unit transferring the control signal to a drive unit, such that the self-propelled load bearing cart follows the projected optical marker.

The method may further comprise the steps of receiving identity information derived from at least one of a wireless signal, received using a wireless communication unit, and an optical code, sensed using the optical sensor, and using the identity information for determining if the projected optical marker should be followed.

Please note that any aspect or part of an aspect as well as any method or part of method or any unit, feature or system could be combined in any applicable way if not clearly contradictory.

BRIEF DESCRIPTIONS OF THE DRAWINGS

The invention will by way of example be described in more detail with reference to the appended schematic drawings, on which:

FIG. 1A shows an elevated view of a virtual coupling between a self-propelled load bearing cart with a modular optical unit and a remote controlled or autonomous self-propelled guide unit.

FIG. 1B shows an enlargement of a portion of the virtual coupling of FIG. 1A.

FIG. 2 shows a perspective elevated view from the left of the modular optical unit.

FIG. 4A shows an elevated view of a system for intralogistics.

FIG. 4B shows an enlargement of a portion of an optical projected route.

FIG. 5A shows a detailed view of the remote controlled or autonomous self-propelled guide unit, according to a first embodiment.

FIG. 5B shows a remote controlled or autonomous self-propelled guide unit, according to a second embodiment and a self-propelled load bearing cart.

FIG. 5B' shows a schematic view of the remote controlled or autonomous self-propelled guide unit, according to the second embodiment.

FIG. 5C shows the remote controlled or autonomous self-propelled guide unit, according to the second embodiment, when interconnected with a self-propelled load bearing cart.

FIG. 6A shows an elevated view of two self-propelled load bearing carts platooning, in a first embodiment.

FIG. 6B shows an elevated view of two self-propelled load bearing carts platooning, in a second embodiment.

FIG. 7 shows an elevated view of a virtual coupling between a self-propelled load bearing cart and a remote controlled or autonomous self-propelled guide unit when the remote controlled or autonomous self-propelled guide unit is flying.

Figure 8:
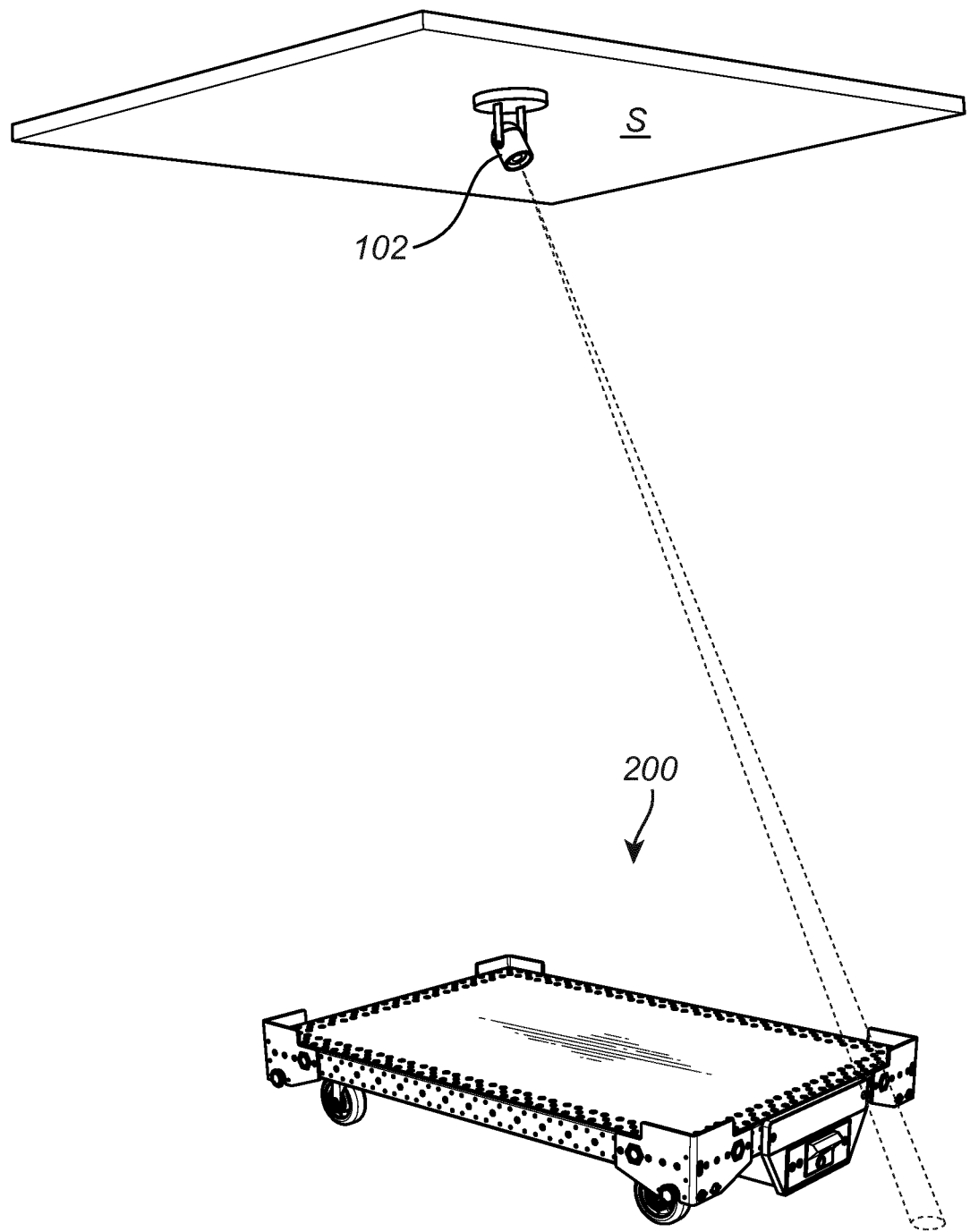

FIG. 8 shows a ceiling mounted stationary projector when part of a logistic system with the self-propelled load bearing cart.

DETAILED DESCRIPTION

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided for thoroughness and completeness.

Variations to the disclosed embodiments can be understood and effected by the skilled person in practicing the claimed invention, from a study of the drawings, the disclosure, and the appended claims.

Figure 1C:
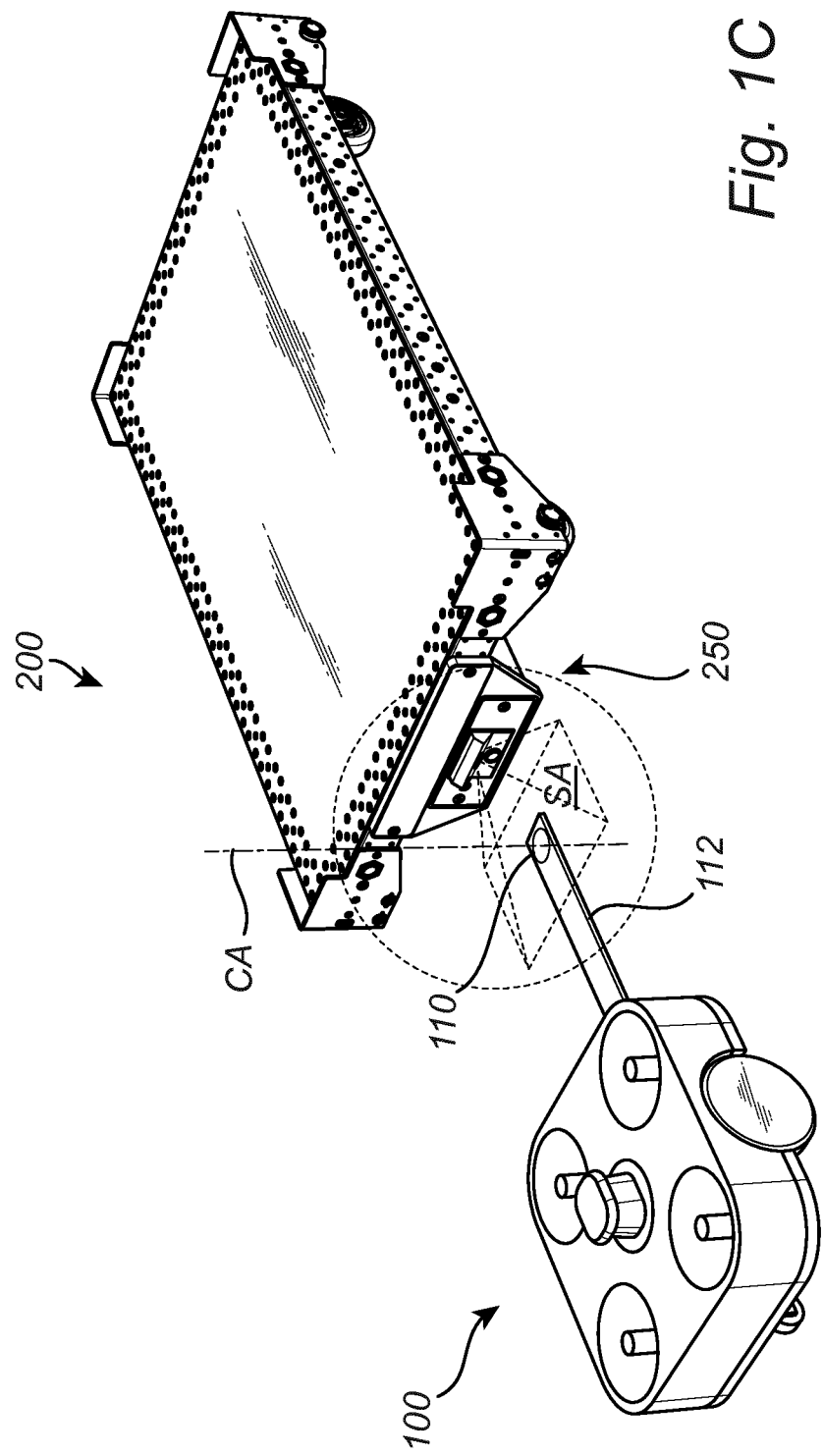
FIG. 1C shows an elevated view of a virtual coupling between a self-propelled load bearing cart with a modular optical unit and a remote controlled or autonomous self-propelled guide unit, in an alternative embodiment.

A logistic system using virtual couplings for moving a self-propelled load bearing cart is provided. The system may be used in intralogistics or in any logistic system in which material, goods or items need to be transported in an efficient and/or autonomous way. A system with virtual couplings is very versatile and easy to adapt, as no mechanical specifically adapted connections are needed. The system can also be easily updated e.g. by software upgrades. In the embodiments described in the appended figures, an optical sensor is configured to sense an optical marker, which is shown as a projected optical marker. However, in any of the embodiments, it is equally conceivable that the optical marker is a printed optical marker which can be placed on any mobile unit acting as a guide unit, thus resulting in the optical marker being mobile. The virtual coupling makes it possible for a self-propelled load bearing cart to be moved either by using a specific guide unit, such as shown in FIGS. 1A, 1C and 7, a stationary guide, such as shown in FIG. 8 or by using another self-propelled load bearing cart as a guide, such as shown in FIGS. 6A and 6B. The system makes it possible to switch between different guides and between printed optical markers and projected optical markers. As an example, the self-propelled load bearing carts can use a specific guide unit, such as a remote controlled, autonomous or driver operated self-propelled guide unit for a relatively long distance transportation, and switch to a stationary guide for high precision short distance transportation. The mobile optical marker could be placed on any existing mobile unit already operating in a logistic system, such as a tow tractor, a manual cart or a forklift.

FIG. 1A shows a virtual coupling between a self-propelled load bearing cart 200 and a mobile optical marker 110 projected on the ground by a remote controlled or autonomous self-propelled guide unit 100. The self-propelled load bearing cart 200 comprises an optical sensor 251 mounted to a tilted protrusion 252 of a modular unit 250 of the self-propelled load bearing cart 200, such that the optical sensor 251 is configured to sense a vertical sensor area SA vertically overlapping the mobile optical marker 110. The optical sensor 251 is configured to derive sensor signals based on sensing of the mobile optical marker 110. The optical sensor 251 is connected to a computing unit 253 (further described with reference to FIG. 2). The computing unit 253 is adapted to receive the sensor signals and determine change in velocity and change in direction of the mobile optical marker 110 and generate control signals on the basis of the determined change in velocity and change in direction. The computing unit then transfers the control signals to a drive unit 223 (further described with reference to FIG. 3) of the self-propelled load bearing cart 200, such that the self-propelled load bearing cart 200 can follow the mobile optical marker 110, and thereby the remote controlled or autonomous self-propelled guide unit 100.

In the embodiment described with reference to FIG. 1A, the guide unit is a remote controlled or autonomous self-propelled guide unit 100. However, in alternative embodiments it is conceivable that the guide unit is a mobile unit operated by a driver.

In the embodiment described with reference to FIG. 1A, the mobile optical marker 110 is a projected mobile optical marker. However, in alternative embodiments, it is equally conceivable that the mobile optical marker is a printed optical marker placed on a guide unit, e.g. by means of an adhesive.

FIG. 1B is an enlargement of the mobile optical marker 110 and the optical sensor 251. In the embodiment disclosed in FIG. 1B, the mobile optical marker 110 is a circular mobile optical marker 110 projected in a color likely to provide contrast against the surface on which it is projected. Suitable colors are clear versions of yellow, blue or red which provide contrast against the typical gray or green colors of factory floors. To enable determination of the change in velocity and of the change in direction of a mobile optical marker 110, the mobile optical marker 110 should preferably display an optical difference in at least two different directions, i.e. the mobile optical marker should preferably not just be a straight line, as this makes it hard to determine movement or change along the length axis of such straight line. An advantage with having a circular optical marker 110 is that the direction of a movement of the circular optical marker 110 in relation to the optical sensor 251 can be instantly derived, as a circular optical marker 110 displays an optical difference in all directions in the projected plane. As such, less computation e.g. with regards to relative movements of different items of the optical marker needs to be made.

The vertical sensor area SA has a vertical sensor area center axis CA, running vertically through the vertical sensor area SA. In the embodiment shown in FIGS. 1A, 1B, the computing unit 253 of the self-propelled load bearing cart 200 is configured to generate control signals for aligning the vertical sensor area SA center axis CA with a center axis of the circular mobile optical marker 110, such that the self-propelled load bearing cart 200 can follow the mobile optical marker 110 by constantly controlling for keeping the mobile optical marker 110 in the center of the vertical sensor area SA.

In the embodiment of FIGS. 1A and 1B, the mobile optical marker 110 further comprises an optical code 111, such as for example a QR-code or barcode. The optical sensor 251 is configured to read the optical code 111, and the computing unit 253 of the self-propelled load bearing cart 200 is configured to derive identity data from the read optical code 111. The computing unit 253 may have the identity data stored in a data storage unit 254 (further described with reference to FIG. 2) connected to the computing unit 253, or may have to fetch the identity data from a database placed at a remote location, such as in a cloud based database.

By the derived identity data, the self-propelled load bearing cart 200 may determine whether or not to follow a specific optical marker and thus which optical marker should be followed.

In an alternative embodiment, the mobile optical marker has the shape of a square and as such displays an optical difference in at least four different directions. In a square, the first and second direction are substantially opposite directions and the third and fourth directions are substantially opposite directions, which makes it possible for a computing unit to compute the direction of relative movement of the mobile optical marker in relation to the optical sensor.

The self-propelled load bearing cart 200 and the remote controlled or autonomous self-propelled guide unit 100 may be in wireless connection with each other, by means of wireless communication units 253' (further described with reference to FIG. 2) in the self-propelled load bearing cart 200 and in the remote controlled or autonomous self-propelled guide unit 100, respectively.

The wireless communication could for example enable the exchange of information and data, which could comprise wireless identity information which could assist or replace identity information in the mobile optical marker 110. One advantage with having the identity information communicated using the wireless communication means is that the communication could be bidirectional, such that the remote controlled or autonomous self-propelled guide unit 100 also may receive identity information from the self-propelled load bearing cart 200. It is further possible to transmit more complex data such as driving instructions from the remote controlled or autonomous self-propelled guide unit 100 for autonomous driving by the self-propelled load bearing cart 200, or information of the specifics of the load on the self-propelled load bearing cart 200 (weight, height etc.) which may affect routes and driving patterns.

FIG. 1C shows a virtual coupling between a self-propelled load bearing cart 200 and a mobile optical marker 110, being a printed mobile optical marker 110 placed on an arm 112 connected to the remote controlled or autonomous self-propelled guide unit 100. Apart from the mobile optical marker 110 being a printed mobile optical marker 110, the features of FIG. 1C are the same as the features of FIG. 1A. The printed mobile optical marker 110 may, just as the projected mobile optical marker, further comprise an optical code, such as for example a QR-code or barcode readable by the optical sensor 251.

FIG. 2 shows the modular optical unit 250, which is seen mounted to the self-propelled load bearing cart 200 in FIG. 1A, in a perspective elevated view from the left. The modular optical unit 250 is configured to be mounted as an inset in a holder fixated to the self-propelled load bearing cart 200 by means of fixation members in the form of screws 256a, 256b positioned in through-holes in a frontal plate 257 of the holder. The optical sensor 251 is mounted to a tilted protrusion 252, which is protruding from the front of the modular unit 250. The tilted protrusion 252 provides an angle to the optical sensor 251, the angle is preferably in the interval 30-90 degrees downwards from the horizontal plane. As the optical sensor 251 is mounted to the tilted protrusion 252, the optical sensor 251 has a sensed area which is tilted downward-forward, such that optical markers placed beneath or below and in front of the optical sensor 251 can be sensed. The downward-forward sensing optical sensor 251 enables sensing of optical markers projected on the ground which creates large freedom with regards to the distance between the unit projecting the optical marker and the optical sensor 251, as well as with regards to the location of the unit projecting the optical marker.

The optical sensor 251 is connected to a computing unit 253, such as a general purpose computer comprising processing and memory means for computations. The computing unit 253 is adapted to receive the sensor signals via the connection 258 and determine change in velocity and change in direction of a mobile optical marker 110 and generate control signals on the basis of the determined change in velocity and change in direction. The computing unit 253 then transfers the control signals to a drive unit 223 (further described with reference to FIG. 3) of the self-propelled load bearing cart 200, such that the self-propelled load bearing cart 200 can follow the mobile optical marker 110. In the embodiment of FIG. 2, the modular optical unit 250 further comprises a battery unit 255 for propelling the self-propelled load bearing cart.

The computing unit 253 is connected to a data storage unit 254. The data storage unit 254 could be configured to store identity data of different units of a logistics system comprising optical markers. This identity data may be used in a determination process to determine which optical markers the self-propelled load bearing cart should follow. The data storage unit 254 may further be used to store data collected from the self-propelled load bearing cart 200 for the purpose of analytics. Data for analytics could for example be data with regards to driving patterns, time of usage, load weights, battery usage etc. The stored data may be transferred to a central system in the logistic system, either continuously by wireless communication or by wired connection e.g. when the batteries 255 of the modular optical unit 250 are charged, or if the entire modular optical unit 250 is replaced when the batteries 255 need recharging.

The computing unit 253 of the modular optical unit 250 may comprise a wireless communication unit 253', such as for example a wireless communication unit based on the IEEE 802.11 standard (WLAN or Wi-Fi) or UHF radio communication such as the IEEE 802.15.1 standard (Bluetooth) or a wireless communication unit based on the 3GPP NR standards (5G) enabling Ultra-Reliable Low-Latency Communications (URLLC), The wireless communication unit 253' may be configured to fetch identity data from a database placed at a remote location, such as in a cloud based database. The identity data may relate to the identity of a guide unit 100 or the identity of a mobile unit operated by a driver or the identity of a fixed installation projecting a mobile optical marker 110. The wireless communication unit 253' may also be used for communicating identity information of the self-propelled load bearing cart 200 to a guide unit 100 and/or assist or replace identity information received from a mobile optical marker 110. The wireless communication between the self-propelled load bearing cart 200 and a guide unit 100 may be bidirectional, such that a guide unit 100 also may receive information from the self-propelled load bearing cart 200, which information could comprise identity and/or the specifics of the load on the self-propelled load bearing cart 200 (weight, height etc.). It is further possible to transmit or receive more complex data such as driving instructions from a guide unit 100 for autonomous driving by the self-propelled load bearing cart 200, or information which may affect routes and driving patterns.

However, in alternative embodiments it is equally conceivable that the battery and/or computing unit and/or storage means are placed at a separate location in the self-propelled load bearing cart 200.

Figure 3:
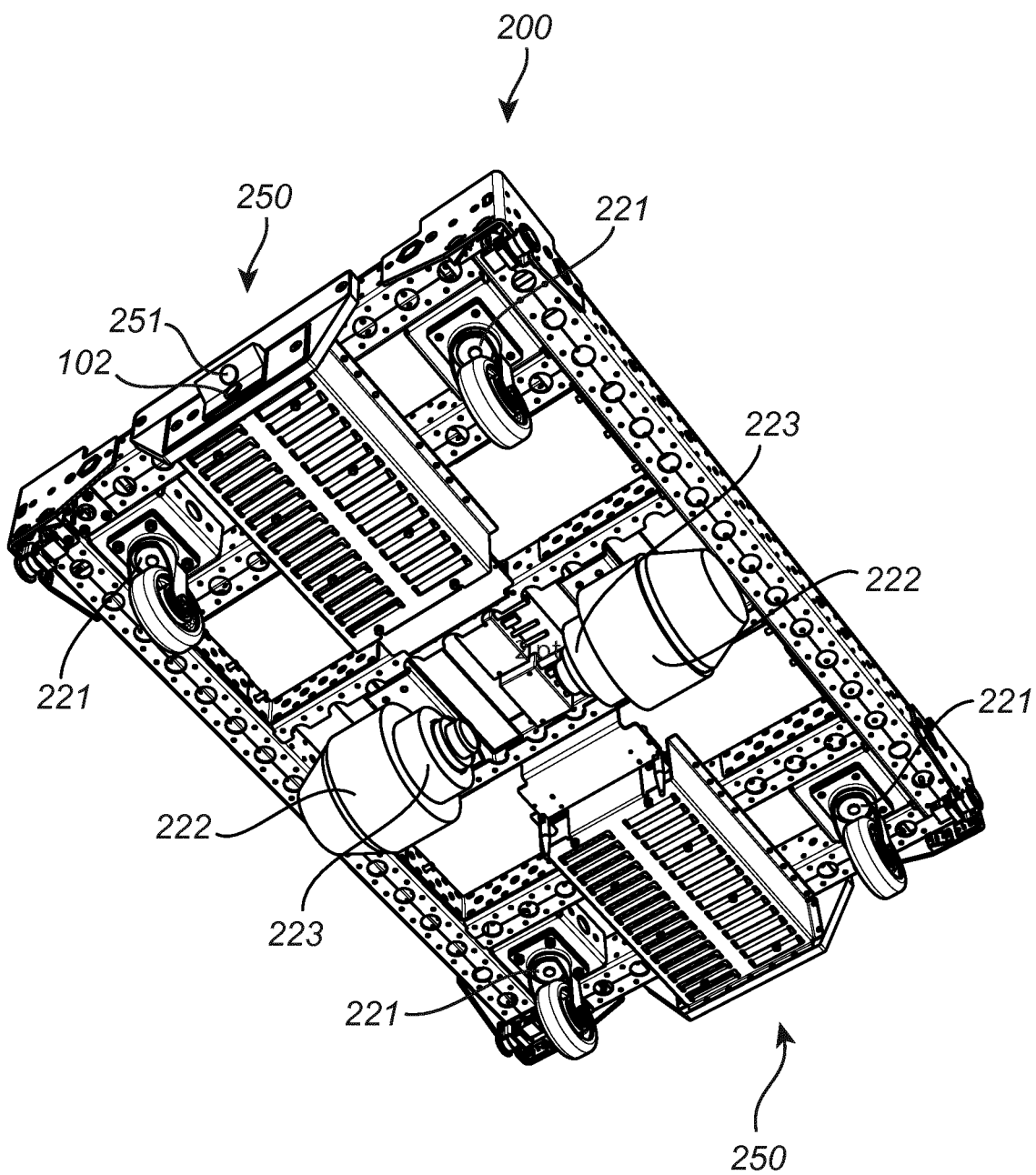
FIG. 3 shows a perspective view of the self-propelled load bearing cart from underneath.

FIG. 3 shows the self-propelled load bearing cart 200 from underneath when two modular optical units 250 have been mounted to the front and rear ends of the self-propelled load bearing cart 200. In the embodiment shown in FIG. 3, both the modular optical unit 250 in the front and the modular optical unit 250 in the rear have an optical sensor 251 and a projector 102 configured to project a mobile optical marker 110. The two modular optical units 250 are connected to a first and second drive unit 223 comprising an electrical motor for propelling the self-propelled load bearing cart 200. The drive units 223 are connected to drive wheels 222. By means of the two drive units 223 being independently operable in both forward and backward rotational direction, the drive units can propel the self-propelled load bearing cart 200 backward and forward as well as rotate the self-propelled load bearing cart 200. The self-propelled load bearing cart 200 is further supported by four swiveling castors 221 which move in a pattern following the propulsion of the two drive units 223.

FIG. 4A shows a system for intralogistics comprising self-propelled load bearing carts 200', 200'', 200''' configured to follow an optical projected route 110'. The self-propelled load bearing carts 200', 200'', 200''' are similar to the self-propelled load bearing cart 200 described with reference to FIGS. 1A-3. The self-propelled load bearing carts 200', 200'', 200''' comprises an optical sensor 251 configured to sense a vertical sensor area SA vertically overlapping a portion of the optical projected route 110'. The optical sensor 251 is configured to derive sensor signals based on sensing of the optical projected route 110'. The self-propelled load bearing carts 200' 200'', 200''' further comprise drive units 223 and computing units 253 (such as described with reference to FIGS. 2 and 3). The computing unit 253 is configured to receive the sensor signals, generate control signals on the basis of the received sensor signals, and transfer the control signals to the drive unit 223, such that the self-propelled load bearing carts 200', 200'', 200''' can follow the optical projected route 110'. The system for intralogistics further comprises a projector 102' configured to project the optical projected route 110'. In the embodiment shown in FIG. 4A, the projector 102' is a sealing mounted projector 102' and the optical projected route 110' is a projected line 110'. The advantage with projecting an optical projected route 110' is that humans working in the area of the system for intralogistics can predict where the self-propelled load bearing carts 200', 200'', 200''' are headed and thus predict the movements of the self-propelled load bearing carts 200', 200'', 200'''. Making the movements of the self-propelled load bearing carts 200', 200'', 200''' more predictable reduces the risk of a collision with a human. The projector 102' may be a projector using light, such as a video projector, or a projector using laser. The projected line 110' in the embodiment of FIG. 4A has a clear endpoint E, which means that the humans operating in the area of the system for intralogistics will get a clear understanding of where the self-propelled load bearing carts 200', 200'', 200''' will stop.

FIG. 4B shows the optical projected route 110' comprising an optical code 111', in the form of a QR code configured to be read by the optical sensor and information from the QR code derived by the computing unit 253. The information may be related to the identity of a self-propelled load bearing cart 200', 200'', 200''' or the identity of a projector. Such identity information could for example be used by the self-propelled load bearing carts 200', 200'', 200''' to know which optical projected route 110' to follow, i.e. a self-propelled load bearing cart 200', 200'', 200''' may only follow an optical projected route 110' comprising identity information pertaining to that specific self-propelled load bearing cart 200', 200'', 200'''. The optical code 111' may also comprise driving instructions for the self-propelled load bearing carts 200', 200'', 200''', such as instructions pertaining to the desired speed of the self-propelled load bearing carts 200', 200'', 200'''.

The optical code 111' may also comprise instructions related to audiovisual features of the self-propelled load bearing carts 200', 200'', 200'''. Such instructions could for example be for the self-propelled load bearing cart 200',

200", 200''' to illuminate in a specific color or to make an audio signal. The audiovisual signals could for example be used to inform the surroundings of the presence of the self-propelled load bearing carts 200', 200", 200''', or the intended future movement of the self-propelled load bearing carts 200', 200", 200''' (much like the turn signals of a car). The optical code could in alternative embodiments be in a different form than the QR code. The optical code could for example be the thickness or color of the projected line 110'. Having the code in a format which is easy for a human to see makes it possible also for the human to determine the future movements of the self-propelled load bearing carts 200', 200", 200''', which reduces the risk of collisions. The color and/or thickness of the projected line 110' could indicate the current or future speed of the self-propelled load bearing carts 200', 200", 200''' which makes it easy for a human operator to predict the movements of the self-propelled load bearing carts 200', 200", 200".

In the embodiment shown in 4A and 4B, the self-propelled load bearing cart 200', 200", 200''' further comprise a wireless communication unit 253' configured to transmit and receive wireless communication to and/or from the projector 102, 102'. The wireless communication could for example contain driving instruction (speed, level of autonomy etc.), instructions with regards to audiovisual signals of the self-propelled load bearing carts 200', 200", 200''', or identity information. Information sent to the projector could for example contain information related to the load, the battery status and/or the driving of the self-propelled load bearing cart 200', 200", 200". The wireless communication may be communicated directly between the self-propelled load bearing carts 200', 200", 200''' and the projector 102', or alternatively be routed through a gateway and/or central system which in turn could communicate with the projector by means of wireless or wired communication.

When the information received wirelessly or encoded in the optical code is driving instructions, the computing unit 253 is further configured to generate control signals on the basis of the driving instructions and transfer the control signals to the drive unit 223, such that the self-propelled load bearing carts 200', 200", 200''' can act in accordance with the instructions.

In the embodiment shown in FIGS. 4A and 4B, the optical projected route 110' is in the form of a projected line have a length exceeding the length L of the self-propelled load bearing cart 200', 200", 200'''. Having a relatively long optical projected route 110' makes it possible for humans in the area to predict the movements of the self-propelled load bearing carts 200', 200", 200" well in advance. In alternative embodiments however, it is conceivable that the length of the optical projected route 110' exceeds the width W of the self-propelled load bearing carts 200', 200", 200''', or in another embodiment exceeds two times the length of the self-propelled load bearing cart 200', 200", 200".

In alternative embodiments to the embodiments shown in FIGS. 4A and 4B, the optical projected route 110' may be assisted or replaced by a fixed line which is painted or adhesively fixated to the floor. The fixed line may also provide input to the self-propelled load bearing cart 200', 200", 200''' in the form of code, which for example could be the color, size or shape of the line.

In one embodiment a factory floor could have a plurality of different lines in different colors and the self-propelled load bearing carts 200', 200", 200" could be programmed to follow different ones of these lines. In other alternatives, the factory floor could comprises a plurality of lines each having different dotting or width to be followed by different self-propelled load bearing carts 200', 200", 200'''. It is also conceivable, as previously discussed in relation to the projected line, that the width, dotting or color of a single line may provide input to the self-propelled load bearing carts 200', 200", 200''' with regards to the allowed speed at a specific area of the factory.

In yet another alternative embodiment, which may be combined with the embodiments already disclosed with regards to line coding and following, the lines may be UV-fluorescent such that they are only visible when exposed to UV-light. The self-propelled load bearing carts 200', 200", 200''' may be equipped with a UV-light such that the lines becomes visible only as the self-propelled load bearing carts 200', 200", 200''' approaches. The path that the self-propelled load bearing cart 200', 200", 200''' will take will be visible by humans interacting with the self-propelled load bearing carts 200', 200", 200''' when that is needed. The configuration with UV-fluorescent lines makes it possible to have a plurality of lines on the factory floor without creating confusion to the human workers in the environment.

In embodiments in which the self-propelled load bearing cart is configured to follow a route, projected or fixed, the self-propelled load bearing cart could be configured to store the route in memory and use the stored route to generate a map to be used for later navigation and/or for displaying the layout of the environment to a human operator. In embodiments in which fixed routes are being created using painted or adhesively fixated lines, the virtual map can then be modeled after the real world, instead of the opposite, which increases the precision with which the map can be generated.

In embodiments in which the lines are adhesively fixated lines, the coding could be in the form of RFID or NFC-tags incorporated in the lines. The tags could provide input to the self-propelled load bearing carts 200', 200", 200''' with respect to speed, height restrictions, weight restrictions etc. and could be connected to a central or distributed system, such that the tags could be remotely reprogramed as the logistics system is updated.

FIG. 5A shows a detailed view of the remote controlled or autonomous self-propelled guide unit 100 shown in FIG. 1A. The remote controlled or autonomous self-propelled guide unit 100 comprises two drive wheels 103 for propulsion and two swiveling castors which follow the movements created by the drive wheels 103. The remote controlled or autonomous self-propelled guide unit 100 comprises a projector 102 configured to project the mobile optical marker 110 and optical sensors 151 for assisting in the navigation of the remote controlled or autonomous self-propelled guide unit 100.

The remote controlled or autonomous self-propelled guide unit 100 further comprises a Lidar 101 using pulsed laser to detect ranges to objects surrounding the remote controlled or autonomous unit 100 and thus assisting in navigation and collision avoidance.

The remote controlled or autonomous self-propelled guide unit 100 described in the embodiment disclosed in FIG. 5A further comprises a wireless communication unit configured to transmit and receive wireless communication to and/or from at least one of: a self-propelled load bearing cart 200, a mobile unit operated by a driver, and a stationary wireless unit being part of a logistic system (shown in FIG. 8). The wireless communication could be information or data e.g. relating to the identity of the remote controlled or autonomous unit 100 or the identity of the self-propelled load bearing cart 200. The wireless communication between the self-propelled load bearing cart and the remote controlled or autonomous unit 100 may be bidirectional, such that the remote controlled or autonomous unit 100 may transmit and/or receive information from/to the self-propelled load bearing cart, which information could comprise, apart from identity information, specifics of the load on the self-propelled load bearing cart (weight, height etc.). It is further possible to transmit and/or receive more complex data such as driving instructions to or from the self-propelled load bearing cart, or information which may affect routes and driving patterns.

The remote controlled or autonomous unit 100 described in the embodiment disclosed in FIG. 5A further comprises means for flying, in the form of four rotors 104 mounted in rotor tunnels. The rotors 104 enable the remote controlled or autonomous unit 100 to fly like a flying drone and project the mobile optical marker 110 while flying above or in from of the self-propelled load bearing cart 200.

FIG. 5B shows a remote controlled or autonomous self-propelled guide unit 100', according to a second embodiment. FIG. 5B further shows a self-propelled load bearing cart 200B, according to an embodiment in which the self-propelled load bearing cart 200B is configured to mechanically connect to the remote controlled or autonomous self-propelled guide unit 100'.

The concept of the embodiment shown in FIGS. 5B and 5C is that the remote controlled or autonomous self-propelled guide unit 100' of could be more competent, faster and lighter than the self-propelled load bearing cart 200B, but lack the load bearing capabilities. This makes it possible to exclude sophisticated, sensitive and expensive components from the self-propelled load bearing cart 200B, making the self-propelled load bearing cart 200B easier to manufacture, more robust and reduces the maintenance cost of the self-propelled load bearing cart 200B. As the load bearing cart 200B is self-propelled, i.e. not pulled by the remote controlled or autonomous self-propelled guide unit 100', the remote controlled or autonomous self-propelled guide unit 100' can be made small, light and fast, making it possible to have the remote controlled or autonomous self-propelled guide unit 100' move about for example a factory setting without many of the risks that unavoidably are present when moving a large and heavy load bearing cart. It is also possible to have fewer remote controlled or autonomous self-propelled guide units 100' moving and/or coordinating a larger amount of self-propelled load bearing carts 200B. Having a sophisticated remote controlled or autonomous self-propelled guide unit 100' may also reduce the requirements on the level of sophistication of the safety systems of the self-propelled load bearing cart 200B, as the remote controlled or autonomous self-propelled guide unit 100' can guide, navigate and sense the environment and control the movement of the self-propelled load bearing cart 200B.

In the embodiment shown in FIGS. 5B and 5C, the self-propelled load bearing cart 200B has an opening in the frontal support beam 270 in which the remote controlled or autonomous self-propelled guide unit 100' fits, such that the remote controlled or autonomous self-propelled guide unit 100' is placed partially under the self-propelled load bearing cart 200B.

FIG. 5B' shows a schematic top view of the remote controlled or autonomous self-propelled guide unit 100' showing the battery 155 of the remote controlled or autonomous self-propelled guide unit 100' being connected to the drive unit 123 as well as to the computing unit 153. The computing units 153 is in turn connected to the drive unit 123, the sensor unit 154 (incorporating sensors or acting as a sensor interface), the transceiving unit 161 and a storage unit 162 for storage of data.

The energy source, battery 155, of the remote controlled or autonomous self-propelled guide unit 100' may be powerful enough to power also the self-propelled load bearing cart 200B. The remote controlled or autonomous self-propelled guide unit 100' is faster and smaller and can without difficulties travel to a charging station without having to consider the current load or the logistic flow. The logistic system and/or the self-propelled load bearing cart 200B also do not have to take into consideration the charge level of the batteries of the self-propelled load bearing cart 200B when logistics and movement is planned.

In conceivable embodiments, the self-propelled load bearing cart 200B may also be used as part of a warehouse system, or as part of a station on an assembly line, which sometimes means that the self-propelled load bearing cart 200B will remain on the same spot for a long time, during which the batteries may be depleted. Having an energy source 155 with sufficient energy in the remote controlled or autonomous self-propelled guide unit 100' for powering the self-propelled load bearing cart 200B removes this problem as the self-propelled load bearing cart 200B can be easily energized by the batteries of the remote controlled or autonomous self-propelled guide unit 100'.

The remote controlled or autonomous self-propelled guide unit 100' comprises a drive unit 123 comprising at least one drive wheel 103 for propelling the remote controlled or autonomous self-propelled guide unit 100'. In the embodiment shown in FIG. 5B, the remote controlled or autonomous self-propelled guide unit 100' comprises a drive unit 123 comprising two drive wheels 103 enabling the control in all directions on a planar surface by altering the rotational speed and/or direction of the drive wheels 103. The drive wheels 103 are drive wheels 103 suitable for use in a warehouse or factory setting and may be drive wheels 103 suitable for use on a flat concrete floor. The drive unit 123 further comprises a sensor unit (integrated in the drive unit or in the sensor unit 154), such as a rotary encoder, sensing the rotational speed of a particular drive wheel 103. The information derived by the rotary encoder may be used to compare the rotational speed of a particular drive wheel 103 to the speed of other drive wheel(s) of the remote controlled or autonomous self-propelled guide unit 100' and/or the drive wheel(s) of the self-propelled load bearing cart 200B and/or to calculated values from the navigation unit and/or to values derived from another type of sensor, such as the lidar 101, to assess direction, load and/or surface conditions, which information could be used as further input to the navigation unit.

The remote controlled or autonomous self-propelled guide unit 100' further comprises a computing unit 153, which in the embodiment shown in FIGS. 5B and 5C is a computing unit 153 which is much more sophisticated than the computing unit of the self-propelled load bearing cart 200B. The more sophisticated computing unit 153 of the remote controlled or autonomous self-propelled guide unit 100' has a faster processing unit, a larger storage capacity (by the storage unit 162), faster connection to other remote controlled or autonomous self-propelled guide units (by the transceiving unit 161) or to logistics systems or to the self-propelled load bearing carts 200B. The computing unit 153 of the remote controlled or autonomous self-propelled guide unit 100' further comprises more I/O-units than the computing unit of the self-propelled load bearing cart 200B, enabling the remote controlled or autonomous self-propelled guide unit 100' to receive input from more sensors.

The remote controlled or autonomous self-propelled guide unit 100' further comprises a navigation unit integrated in the computing unit 153 for navigating in an environment, such as the environment of a factory or a warehouse. The navigation unit is configured to receive input from the sensor unit 154 of the remote controlled or autonomous self-propelled guide unit 100' and/or from a central navigation or logistics system and/or from satellites or other wireless sources and/or from other remote controlled or autonomous self-propelled guide units or the self-propelled load bearing carts 200B in the environment. The navigation unit enables the computing unit 153 to generate control signals on the basis of input from the navigation unit and the sensor unit 154 and transmit the control signals using the transceiving unit 161, via electrical connection or wireless connection, to the self-propelled load bearing cart 200B for controlling the drive unit of the self-propelled load bearing cart 200B.

The remote controlled or autonomous self-propelled guide unit 100' further comprises sensor(s) placed in, or connected to, the sensor unit 154. The sensors may be sensors for sensing objects in the environment. In the embodiment shown in FIGS. 5B and 5C, the sensor unit comprises a Lidar 101 using pulsed laser to detect ranges to objects surrounding the remote controlled or autonomous unit 100' and thus assisting in navigation and collision avoidance. It is however conceivable that the remote controlled or autonomous self-propelled guide unit 100' further comprises radar units, sonic sensor units and/or optical sensor units, IR or cameras using image recognition.

In the embodiment shown in FIGS. 5B and 5C, the remote controlled or autonomous self-propelled guide unit 100' has a size which is less than 50% of the size of the self-propelled load bearing cart 200B. In the embodiment shown in FIGS. 5B and 5C, the length 100L of the remote controlled or autonomous self-propelled guide unit 100' is less than 50% of the length 200L of the self-propelled load bearing cart 200B, the width 100W of the remote controlled or autonomous self-propelled guide unit 100' is less than 50% of the width 200W of the self-propelled load bearing cart 200B, and the weight of the remote controlled or autonomous self-propelled guide unit 100' is less than 50% of the weight of the self-propelled load bearing cart 200B. In alternative embodiments, the length 100L and/or width 100W and/or weight of the remote controlled or autonomous self-propelled guide unit 100' may be less than 30% of the length 200L and/or width 200W and/or weight of the self-propelled load bearing cart 200B.

In the embodiment shown in FIGS. 5B and 5C, the remote controlled or autonomous self-propelled guide unit 100' has a top speed which is at least 200% of the top speed of the self-propelled load bearing cart 200B, which means that the remote controlled or autonomous self-propelled guide unit 100' can move around in an environment, such as a factory, much quicker when not being connected to a self-propelled load bearing cart 200B.

In the embodiment shown in FIGS. 5B and 5C, the mechanical interconnection is configured to fixate the remote controlled or autonomous self-propelled guide unit 100' to the self-propelled load bearing cart 200B both in the direction of a length axis LA of the self-propelled load bearing cart 200B and in a direction perpendicular to the length axis LA of the self-propelled load bearing cart 200B, such that the remote controlled or autonomous self-propelled guide unit 100' and the self-propelled load bearing cart 200B moves as a single unit when interconnected, i.e. without any operable joint between them. A complete fixation between the remote controlled or autonomous self-propelled guide unit 100' and the self-propelled load bearing cart 200B makes it easier for the computing unit 153 of the remote controlled or autonomous self-propelled guide unit 100' to determine the exact position and direction of movement of the self-propelled load bearing cart 200B.

Turning to the self-propelled load bearing cart 200B shown in FIGS. 5B and 5C, the self-propelled load bearing cart 200B comprises two drive wheels (such as the drive wheels 222 shown in FIG. 3) for propulsion, and four swiveling castors 221 placed in each corner of the self-propelled load bearing cart 200B which follow the movements created by the drive wheels. In the embodiment shown in FIGS. 5B and 5C, the self-propelled load bearing cart 200B is configured to carry a single Euro-pallet and the size of the top surface TS of the self-propelled load bearing cart 200B thus has a size adapted therefor. However, in alternative embodiments, the size of the self-propelled load bearing cart 200B may be different, e.g. for carrying two Euro-pallets or for holding a rack or shelf system. In embodiments in which the self-propelled load bearing cart 200B is made larger, or made for sustaining a larger load, the number of swiveling castors may be increased accordingly.

In alternative embodiments it is also conceivable that the self-propelled load bearing cart comprises only a single drive wheel which could be adapted for propulsion only, or for steering and propulsion. In embodiments in which a single drive wheel is adapted for steering and propulsion, the single wheel is turnable by means of for example a powered actuator. In embodiments in which the single drive wheel is configured for propulsion only, the self-propelled load bearing cart may be steered by the remote controlled or autonomous self-propelled guide unit 100'.

In the embodiment shown in FIGS. 5B and 5C, the corners of the self-propelled load bearing cart 200B comprises support elements 271 for supporting a Euro-pallet, such that the Euro-pallet remains fixated on the self-propelled load bearing cart 200B when the self-propelled load bearing cart 200B moves. In alternative embodiments, the support elements 271 in the corners may be omitted or replaced by elements for the fixation of further structures on the self-propelled load bearing cart 200B, such as a shelf or rack system, or any elements suitable for the fixation or support of goods being transported by the self-propelled load bearing cart 200B. The elements for the fixation of further structures could for example be an interface 272 of holes positioned on the top surface TS or on the support beams 270, in which interface 172 further structures can be fixated using screws.

In the embodiment shown in FIGS. 5B and 5C, the self-propelled load bearing cart 200B comprises a computing unit (such as the computing unit shown in FIG. 2). The computing unit is configured to control the drive unit and thus the drive wheels, handle input from sensors on the self-propelled load bearing cart 200B and for handling communication. For that purpose, the self-propelled load bearing cart 200B may further comprise a wireless transceiver, which may be a wireless communication unit (such as the wireless communication unit 253' shown in FIG. 2) configured to transmit and receive wireless communication to and/or from the remote controlled or autonomous self-propelled guide unit 100' and/or a mobile unit operated by a driver and/or a stationary wireless unit being part of a logistic system. The wireless communication could be information or data e.g. relating to the identity, the driving or the navigation of the self-propelled load bearing cart 200B, or identity information or information with regards to the load on the self-propelled load bearing cart 200B (weight, height etc.).

As described earlier, self-propelled load bearing cart 200B may be powered by the energy source of the remote controlled or autonomous self-propelled guide unit 100'. However, in alternative embodiments the self-propelled load bearing cart may have an energy source of its own which is used on its own or in combination with the energy source of the remote controlled or autonomous self-propelled guide unit 100'. The energy source of the self-propelled load bearing cart may be a smaller battery capable of powering the self-propelled load bearing cart for short movements (such as short directly controlled movements by an operator). The energy source of the self-propelled load bearing cart may be configured to be charged by and from the remote controlled or autonomous self-propelled guide unit 100' by means of an electrical connection between the remote controlled or autonomous self-propelled guide unit 100' and the self-propelled load bearing cart 200B.

FIG. 5C shows the remote controlled or autonomous self-propelled guide unit 100', according to the embodiment shown in FIG. 5B, when interconnected with the self-propelled load bearing cart according to the embodiment shown in FIG. 5B. The mechanical connection between the self-propelled load bearing cart 200B and the remote controlled or autonomous self-propelled guide unit 100' may be based on a mechanical connection with at least one recess 172 and at least one protrusion 171. In the embodiment shown in FIG. 5C, the remote controlled or autonomous self-propelled guide unit 100' comprises the protrusion 171 that fits and/or locks in a recess 172 of the self-propelled load bearing cart 200B such that a mechanical interconnection is created which fixates the remote controlled or autonomous self-propelled guide unit 100' to the self-propelled load bearing cart 200B. However, it is equally conceivable that the self-propelled load bearing cart 200B comprises a protrusion that fits and/or locks in a recess of the remote controlled or autonomous self-propelled guide unit 100'. The mechanical connection between the self-propelled load bearing cart 200B and the remote controlled or autonomous self-propelled guide unit 100' shown in FIG. 5C may in some embodiments be assisted or replaced by a magnetic connection.

The self-propelled load bearing cart 200B and the remote controlled or autonomous self-propelled guide unit 100' could each comprise an electrical connection 173',173" for electrically connecting the remote controlled or autonomous self-propelled guide unit 100' to the self-propelled load bearing cart 200B. In the embodiment shown in FIG. 5C, the electrical connection 173',173" is separate from the mechanical connection, however, in alternative embodiments it is equally conceivable that the electrical connection 173',173" is integrated in the mechanical connection 171, 172. The electrical connection 173',173" could be configured such that electrical energy and/or data may be transferred between the remote controlled or autonomous self-propelled guide unit 100' and the self-propelled load bearing cart 200B. It is however also conceivable that the electrical connection 173'173" is only configured to transfer electrical energy, in which case the remote controlled or autonomous self-propelled guide unit 100' and the self-propelled load bearing cart 200B may be wirelessly connected to each other for transferring data.

In the embodiment shown in FIG. 5C, the self-propelled load bearing cart 200B further comprises corner modules 273 comprising sensors in the form of Lidars for detecting objects and movement in the environment surrounding the self-propelled load bearing cart 200B. It is conceivable that only two of the corner modules 273, preferably two corner modules placed diagonally, comprises Lidars. When each of the diagonally placed Lidars creates a 270-degree view, the entire surroundings of the self-propelled load bearing cart 200B will be covered. The corner modules 273 shown in FIG. 5C further comprises lighting modules for alerting the surroundings of the movement of the self-propelled load bearing cart 200B.

In alternative embodiments, the corner modules may be omitted or replaced by corner modules only comprising lighting modules and/or contact sensors. Omitting or replacing the corner modules will reduce the cost and facilitate maintenance of the self-propelled load bearing carts. In embodiments in which the sensor capabilities of self-propelled load bearing cart 200B is reduced, the remote controlled or autonomous self-propelled guide unit 100' will have increased responsibility for the safety and for the navigation.

The embodiment shown in FIGS. 5B and 5C may very well be combined with the platooning shown in e.g. FIGS. 6A and 6B, such that a remote controlled or autonomous self-propelled guide unit 100' controls a first self-propelled load bearing cart and further self-propelled load bearing carts follow in a virtual train-like formation. In embodiments in which the self-propelled load bearing carts are mainly made to follow, the sensor and navigation capabilities of the self-propelled load bearing carts may be reduced. More complex sensors such as Lidars may be replaced by more simple sensors such as contact sensors (e.g. air-filled tubes connected to a microswitch). Such contact sensors could for example be used to stop the platoon if a person or object is placed in between the self-propelled load bearing carts forming the platoon.

FIG. 6A shows two self-propelled load bearing carts 200', 200" platooning, i.e. the first self-propelled load bearing cart 200' acts as a guide unit guiding and leading the second self-propelled load bearing cart 200" which consequently follows. In the embodiment shown in FIG. 6A, the modular optical units 250', 250" are both identical units to the unit 250 described with reference to FIG. 2, and both the first 250' and second 250" modular optical unit has the capability of projecting a mobile optical marker 110 and sensing a mobile optical marker 110. However, in alternative embodiments, it is equally conceivable that the first and second modular optical units are different, e.g. such that only one type of modular optical unit only can project the mobile optical marker and only a different type of modular optical unit only can sense the mobile optical marker.

The first self-propelled load bearing cart 200' projects a mobile optical marker 110 and the second self-propelled load bearing cart 200" senses a vertical sensor area SA vertically overlapping the mobile optical marker 110, such that the optical sensor 250" of the second self-propelled load bearing cart 200" optically senses the mobile optical marker 110. The mobile optical marker 110 may comprise an optical code 111 (described with reference to FIG. 1B) verifying that the mobile optical marker 110 is the correct mobile optical marker to follow. Alternatively, the first and second self-propelled load bearing carts 200', 200" may be connected to each other by wireless connection. The step of mutual verification of the identity of the first and second self-propelled load bearing carts 200', 200" may be done by means of the wireless communication.

The computing unit 253 of the modular optical unit 250" of the second self-propelled load bearing cart 200" receives sensor signals from the optical sensor and determines change in velocity and change in direction of the mobile optical marker 110 and thus of the first self-propelled load bearing cart 200' which it is to follow. The computing unit 253 then generates control signals on the basis of the determined change in velocity and change in direction. The computing unit 253 then transfers the control signals to the drive unit of the second self-propelled load bearing cart 200", such that the second self-propelled load bearing cart 200" can follow the mobile optical marker 110, and thereby the first self-propelled load bearing cart 200'.

FIG. 6B shows two self-propelled load bearing carts 200', 200" platooning, i.e. the first self-propelled load bearing cart 200' acts as a guide unit guiding leading the second self-propelled load bearing cart 200" which consequently follows. In the embodiment shown in FIG. 6B, the first self-propelled load bearing cart 200' comprises a printed mobile optical marker 110 placed on an arm 112 connected to the rear of the first self-propelled load bearing cart 200'. The first self-propelled load bearing cart 200' only has a modular optical unit 250' in the front, which makes this a cheaper alternative. The printed mobile optical marker 110 may, just as the projected mobile optical marker, further comprise an optical code, such as for example a QR-code or barcode readable by the optical sensor.

FIG. 7 shows the embodiment of FIG. 1A with a self-propelled load bearing cart 200 being guided by a remote controlled or autonomous unit 100. In the situation depicted in FIG. 7, the remote controlled or autonomous unit 100 is using its flying capabilities (further described with reference to FIG. 5) to guide the self-propelled load bearing cart 200 from the air. One advantage of this is that the remote controlled or autonomous unit 100 can access areas having limited accessibility. Also, the remote controlled or autonomous unit 100 can rapidly move across for example a factory when a guiding task has been concluded.

FIG. 8 shows a ceiling C mounted stationary projector 102 which is part of a logistics system for guiding self-propelled load bearing carts 200. The ceiling mounted stationary projector 102 can move in all directions and thereby project the mobile optical marker onto any surface within its reach. The ceiling mounted stationary projector 102 can for example be placed at a location at which the self-propelled load bearing carts 200 should park for loading or unloading, and thus function as a local parking assistant or having a function similar to that of a maritime pilot, guiding a self-propelled load bearing cart 200 in areas in which high precision is important. The ceiling mounted stationary projector 102 may further function as a stationary wireless unit communicating and/or routing wireless communication to and/or from the self-propelled load bearing carts and/or the remote controlled or autonomous units.

Please note that any aspect or part of an aspect as well as any method or part of method or any unit, feature or system could be combined in any applicable way if not clearly contradictory.

NUMBERED EMBODIMENTS

In the following, exemplifying numbered embodiments are provided in groups A and B and numbered within that group. The numbered embodiments are not to be seen as limiting the scope of the invention, which is defined by the appended claims. The reference numerals in the different numbered embodiments are to be seen only as examples of elements in the appended drawings which correspond to elements described in the numbered embodiments.

Numbered Embodiment A 1-15

1. A system for intralogistics comprising:
   a self-propelled load bearing cart (200, 200', 200", 200''') configured to follow an optical projected route (110'), the self-propelled load bearing cart (200, 200', 200", 200''') comprising:
      an optical sensor (251) configured to sense a vertical sensor area (SA) vertically overlapping a portion of the optical projected route (110'), wherein the optical sensor (251) is configured to derive sensor signals based on sensing of the optical projected route (110'),
      a drive unit (223), and
      a computing unit (253) configured to:
         receive the sensor signals,
         generate control signals on the basis of the received sensor signals, and
         transfer the control signals to the drive unit (223), such that the self-propelled load bearing cart (200, 200', 200", 200''') can follow the optical projected route (110'), the system further comprises
      a projector (102, 102') configured to project the optical projected route (110').
2. The system according to embodiment 1, wherein the optical projected route (110') comprises a projected line (110'), and wherein self-propelled load bearing cart (200, 200', 200", 200''') is configured to follow the projected line (110').
3. The system according to any of embodiments 1 and 2, wherein the optical projected route (110'), comprises an optical code (111'), and wherein:
   the optical sensor (251) is configured to read the optical code (111'), and
   the computing unit (253) is configured to derive information from the read optical code (111').
4. The system according to embodiment 3, wherein the optical code comprises a QR code.
5. The system according to embodiment 3, wherein the optical code (111') comprises the thickness of the projected line (110').
6. The system according to embodiment 3, wherein the optical code (111') comprises the color of the projected line (110').
7. The system according to any one of the preceding embodiments, wherein the self-propelled load bearing cart (200, 200', 200", 200''') comprises a wireless communication unit (253') configured to at least one of transmit and receive wireless communication to and/or from the projector (102, 102').
8. A method in a system for intralogistics, the method comprising:
   projecting, using a projector (102, 102'), an optical projected route (110') onto a surface, the optical projected route (110') being a route to be followed by a self-propelled load bearing cart (200, 200', 200", 200'''), and
   the self-propelled load bearing cart (200, 200', 200", 200''') following the optical projected route (110').
9. The method according to embodiment 8, wherein projecting the optical projected route (110') comprises projecting an optical projected route (110') having a length exceeding the length of the self-propelled load bearing cart (200, 200', 200", 200''').
10. The method according to any one of embodiments 8 and 9, wherein projecting an optical projected route (110') comprises projecting a line (110'), and wherein the self-propelled load bearing cart (200, 200', 200", 200'") following the optical projected route (110') comprises the self-propelled load bearing cart (200, 200', 200", 200'") following the projected line (110').

11. The method according to any of embodiments 8-10, wherein projecting an optical projected route (110') comprises projecting an optical code (111'), and wherein the method further comprises:
  the self-propelled load bearing cart (200, 200', 200", 200'") reading the optical code (111') using an optical sensor (251), and
  the computing unit (253) deriving information from the read optical code (111').

12. The method according to embodiment 11, wherein reading the optical code (111') comprises reading a QR code.

13. The method according to embodiment 11, wherein reading the optical code (111') comprises assessing the thickness and/or color of the projected line (110').

14. The method according to any one of embodiments 8-13, further comprising the computing unit (253) generating control signals on the basis of the derived information.

15. The method according to any one of embodiments 8-14, further comprising:
  the self-propelled load bearing cart (200, 200', 200", 200'") transmitting wireless communication directly or indirectly to the projector (102, 102'),
  the projector (102, 102') receiving the communication, and
  the projector (102, 102') adapting the optical projected route (110') in response to the received communication.

Numbered Embodiment B 1-15

1. A modular optical unit (250, 250', 250") configured to be mounted to a self-propelled load bearing cart (200, 200', 200"), the modular optical unit (250, 250', 250") comprising:
  an optical sensor (251) configured to sense a vertical sensor area (SA) vertically overlapping a mobile optical marker (110), wherein the optical sensor (251) is configured to derive sensor signals based on optical sensing of the mobile optical marker (110),
  a computing unit (253) configured to:
    receive the sensor signals,
    determine change in velocity and change in direction of the mobile optical marker (110),
    generate control signals on the basis of the determined change in velocity and change in direction, and
    transfer the control signals to the self-propelled load bearing cart (200, 200', 200"), such that the self-propelled load bearing cart (200, 200', 200") can follow the mobile optical marker (110).

2. The modular optical unit according to embodiment 1, further comprising a wireless communication unit (253'), wherein the wireless communication unit (253') is configured to at least one of transmit or receive a wireless identity signal.

3. The modular optical unit according to any one of embodiments 1 and 2, wherein the mobile optical marker (110) comprises an optical code (111), and wherein:
  the optical sensor (251) is configured to read the optical code (111), and
  the computing unit (253) is configured to derive identity data from the read optical code.

4. A virtual coupling between a self-propelled load bearing cart (200, 200', 200") and a mobile optical marker (110), the virtual coupling comprising:
  a mobile optical marker (110), and
  an optical sensor (251) mounted to the self-propelled load bearing cart (200, 200', 200"), wherein the optical sensor (251) is configured to sense a vertical sensor area (SA) vertically overlapping the mobile optical marker (110), and wherein the optical sensor (251) is configured to derive sensor signals based on sensing of the mobile optical marker (110).

5. The virtual coupling according to embodiment 4, wherein the virtual coupling further comprises a computing unit (253) configured to:
  receive the sensor signals,
  determine change in velocity and change in direction of the mobile optical marker (110),
  generate control signals on the basis of the determined change in velocity and change in direction, and
  transfer the control signals to the self-propelled load bearing cart (200, 200', 200"), such that the self-propelled load bearing cart (200, 200', 200") can follow the mobile optical marker (110).

6. The virtual coupling according to any one of embodiments 4-5, further comprising a remote controlled or autonomous unit (100) comprising the mobile optical marker (110).

7. The virtual coupling according to embodiment 6, wherein the remote controlled or autonomous unit (100) comprises a projector (102) configured to project the mobile optical marker (110).

8. The virtual coupling according to embodiment 7, wherein the projector (102) is further configured to project an optical code (111) comprising identity information, to be read by the optical sensor (251).

9. The virtual coupling according to any one of embodiments 6-8, wherein the remote controlled or autonomous unit (100) comprises a wireless communication unit configured to at least one of transmit and receive wireless communication to or from the self-propelled load bearing cart (200, 200', 200").

10. The virtual coupling according to embodiment 9, wherein the wireless communication unit is configured to at least one of receive and transmit identity information to or from the self-propelled load bearing cart (200, 200', 200").

11. The virtual coupling according to any one of embodiments 5-10, wherein the mobile optical marker (110) comprises an optical code (111), and wherein:
  the optical sensor (251) is configured to read the optical code (111), and
  the computing unit (253) is configured to derive identity data from the read optical code (111).

12. The virtual coupling according to embodiment 11, wherein the remote controlled or autonomous unit (100) comprises means for flying (104).

13. A self-propelled load bearing cart (200, 200', 200") configured to follow a mobile optical marker (110), the self-propelled load bearing cart (200, 200', 200") comprising:
  an optical sensor (251) configured to sense a vertical sensor area (SA) vertically overlapping the mobile optical marker (110), wherein the optical sensor (251) is configured to derive sensor signals based on sensing of the mobile optical marker (110),
  a drive unit (223), and
  a computing unit (253) configured to:
    receive the sensor signals,
    determine change in velocity and change in direction of the mobile optical marker (110),
    generate control signals on the basis of the determined change in velocity and change in direction, and transfer the control signals to the drive unit (223), such that the self-propelled load bearing cart (200, 200', 200") can follow the mobile optical marker (110).

14. The self-propelled load bearing cart according to embodiment 13, wherein the mobile optical marker (110) comprises an optical code, and wherein:
the optical sensor (251) is configured to read the optical code, and
the computing unit (253) is configured to derive identity data from the read optical code.

15. A method in a self-propelled load bearing cart (200, 200', 200"), the method comprising:
sensing a projected mobile optical marker (110), using an optical sensor (251),
deriving a control signal from the sensed mobile optical marker (251), using a computing unit (253), and
transferring the control signal to a drive unit (223), such that the self-propelled load bearing cart (200, 200', 200") follows the projected optical marker (110).

The different aspects or any part of an aspect of the different numbered embodiments or any part of an embodiment may all be combined in any possible way. Any method embodiment or any step of any method embodiment may be seen also as an apparatus description, as well as, any apparatus embodiment, aspect or part of aspect or part of embodiment may be seen as a method description and all may be combined in any possible way down to the smallest detail. Any detailed description should be interpreted in its broadest outline as a general summary description.

What is claimed is:

1. A system for intralogistics comprising a self-propelled load bearing cart and a remote controlled or autonomous self-propelled guide unit, wherein the self-propelled load bearing cart comprises:
    a drive unit comprising at least one drive wheel for propelling the self-propelled load bearing cart,
    a mechanical connection, and
    a computing unit connected to the drive unit, the computing unit comprises a transceiver for communicating with the remote controlled or autonomous self-propelled guide unit, and wherein the remote controlled or autonomous self-propelled guide unit comprises:
    a mechanical connection configured to connect to the mechanical connection of the self-propelled load bearing cart, such that a mechanical interconnection can be created between the remote controlled or autonomous self-propelled guide unit and the self-propelled load bearing cart,
    a drive unit comprising at least one drive wheel for propelling the remote controlled or autonomous self-propelled guide unit, and
    a computing unit comprising:
        a transceiver for communicating with the transceiver of the self-propelled load bearing cart,
        a navigation unit for navigating in an environment, and
        a sensor unit for sensing objects in the environment, wherein:
            the remote controlled or autonomous self-propelled guide unit is smaller than the self-propelled load bearing cart,
            the self-propelled load bearing cart is configured for carrying heavier loads than the remote controlled or autonomous self-propelled guide unit, and
            the computing unit of the remoted controlled or autonomous self-propelled guide unit is configured to generate control signals on the basis of input from the navigation unit and the sensor unit and transmit the control signals using the transceiver to the self-propelled load bearing cart for controlling the drive unit of the self-propelled load bearing cart.

2. The system according to claim 1, wherein the remote controlled or autonomous self-propelled guide unit has a size which is less than 50% of the size of the self-propelled load bearing cart.

3. The system according to claim 1, wherein the remote controlled or autonomous self-propelled guide unit has a top speed which is at least 200% of the top speed of the self-propelled load bearing cart.

4. The system according to claim 1, wherein the mechanical interconnection is configured to fixate the remote controlled or autonomous self-propelled guide unit to the self-propelled load bearing cart.

5. The system according to claim 1, wherein the remote controlled or autonomous self-propelled guide unit and the self-propelled load bearing cart each comprises an electrical connection, such that the remote controlled or autonomous self-propelled guide unit can be electrically connected to the self-propelled load bearing cart.

6. The system according to claim 5, wherein the electrical connection of the remote controlled or autonomous self-propelled guide unit and the self-propelled load bearing cart is configured to transfer electrical energy.

7. The system according to claim 6, wherein the remote controlled or autonomous self-propelled guide unit comprises an energy storage for powering the self-propelled load bearing cart.

8. The system according to claim 5, wherein the electrical connection of the remote controlled or autonomous self-propelled guide unit and the self-propelled load bearing cart is configured to transfer data.

9. The system according to claim 1, wherein the transceiver of the remote controlled or autonomous self-propelled guide unit and the self-propelled load bearing cart are wireless transceivers.

10. The system according to claim 1, wherein the mechanical connection of the self-propelled load bearing cart comprises at least one of a recess and a protrusion and the mechanical connection of the remote controlled or autonomous self-propelled guide unit comprises at least one of a corresponding recess or protrusion for mechanical interconnection between the self-propelled load bearing cart and the remote controlled or autonomous self-propelled guide unit.

11. The system according to claim 1, wherein the self-propelled load bearing cart further comprises at least one sensor, and wherein the transceiver of the self-propelled load bearing cart is configured to transmit sensor data to the transceiver of the remote controlled or autonomous self-propelled guide unit.

12. The system according to claim 11, wherein the remote controlled or autonomous self-propelled guide unit is configured to generate control signals on the basis of the received sensor data.

13. The system according to claim 11, wherein the self-propelled load bearing cart comprises at least one of a sensor selected from a list consisting of pressure sensors, motion sensors and Lidar.

14. The system according to claim 1, wherein the remote controlled or autonomous self-propelled guide unit is configured to be placed at least partially under the self-propelled load bearing cart.

15. The system according to claim 1, wherein the self-propelled load bearing cart comprises at least one support element for supporting a Euro-pallet.

16. The system according to claim 1, wherein the mechanical connection is configured to fixate the remote controlled or autonomous self-propelled guide unit to the self-propelled load bearing cart both in the direction of a length axis of the self-propelled load bearing cart and in a direction perpendicular to the length axis of the self-propelled load bearing cart.

17. A system for intralogistics comprising a self-propelled load bearing cart and a remote controlled or autonomous self-propelled guide unit, wherein the self-propelled load bearing cart comprises:
- a drive unit comprising at least one drive wheel for propelling the self-propelled load bearing cart,
- a mechanical connection, and
- a computing unit connected to the drive unit, the computing unit comprises a transceiver for communicating with the remote controlled or autonomous self-propelled guide unit, and wherein the remote controlled or autonomous self-propelled guide unit comprises:
  - a mechanical connection configured to connect to the mechanical connection of the self-propelled load bearing cart, such that a mechanical interconnection can be created between the remote controlled or autonomous self-propelled guide unit and the self-propelled load bearing cart,
  - a drive unit comprising at least one drive wheel for propelling the remote controlled or autonomous self-propelled guide unit, and
  - a computing unit comprising:
    - a transceiver for communicating with the transceiver of the self-propelled load bearing cart,
    - a navigation unit for navigating in an environment, and
    - a sensor unit for sensing objects in the environment, wherein:
      - the remote controlled or autonomous self-propelled guide unit is smaller than the self-propelled load bearing cart,
      - the remote controlled or autonomous self-propelled guide unit is faster than the self-propelled load bearing cart, and
      - the computing unit of the remote controlled or autonomous self-propelled guide unit is configured to generate control signals on the basis of input from the navigation unit and the sensor unit and transmit the control signals using the transceiver to the self-propelled load bearing cart for controlling the drive unit of the self-propelled load bearing cart.

18. The system according to claim 17, wherein the remote controlled or autonomous self-propelled guide unit is configured to be placed at least partially under the self-propelled load bearing cart.

19. The system according to claim 17, wherein the self-propelled load bearing cart further comprises at least one sensor, and wherein the transceiver of the self-propelled load bearing cart is configured to transmit sensor data to the transceiver of the remote controlled or autonomous self-propelled guide unit, and wherein the remote controlled or autonomous self-propelled guide unit is configured to generate control signals on the basis of the received sensor data.

20. The system according to claim 17, wherein the remote controlled or autonomous self-propelled guide unit and the self-propelled load bearing cart each comprises an electrical connection, such that the remote controlled or autonomous self-propelled guide unit can be electrically connected to the self-propelled load bearing cart, wherein the electrical connection of the remote controlled or autonomous self-propelled guide unit and the self-propelled load bearing cart is configured to transfer electrical energy, and wherein the remote controlled or autonomous self-propelled guide unit comprises an energy storage for powering the self-propelled load bearing cart.

* * * * *